(12) United States Patent
Lloyd et al.

(10) Patent No.: US 10,128,519 B2
(45) Date of Patent: Nov. 13, 2018

(54) AQUEOUS ALL-COPPER REDOX FLOW BATTERY

(71) Applicant: AALTO UNIVERSITY FOUNDATION, Aalto (FI)

(72) Inventors: David Lloyd, Espoo (FI); Laura Sanz, Madrid (ES)

(73) Assignee: AALTO UNIVERSITY FOUNDATION, Aalto (FI)

( * ) Notice: Subject to any disclaimer, the term of this patent is extended or adjusted under 35 U.S.C. 154(b) by 0 days.

(21) Appl. No.: 15/125,671

(22) PCT Filed: Mar. 13, 2015

(86) PCT No.: PCT/FI2015/050166
§ 371 (c)(1),
(2) Date: Sep. 13, 2016

(87) PCT Pub. No.: WO2015/136158
PCT Pub. Date: Sep. 17, 2015

(65) Prior Publication Data
US 2017/0033383 A1 Feb. 2, 2017

Related U.S. Application Data

(60) Provisional application No. 61/952,156, filed on Mar. 13, 2014.

(51) Int. Cl.
*H01M 8/08* (2016.01)
*H01M 8/18* (2006.01)
(Continued)

(52) U.S. Cl.
CPC ......... *H01M 8/08* (2013.01); *H01M 8/04276* (2013.01); *H01M 8/18* (2013.01);
(Continued)

(58) Field of Classification Search
CPC ...... H01M 8/08; H01M 8/04276; H01M 8/18; H01M 8/20; H01M 8/2465; H01M 8/188; Y02E 60/528
See application file for complete search history.

(56) References Cited

U.S. PATENT DOCUMENTS

2013/0224632 A1* 8/2013 Roumi ................. H01M 2/166
429/516

FOREIGN PATENT DOCUMENTS

WO          03/092138 A2    11/2003
WO       2014/207923 A1    12/2014

OTHER PUBLICATIONS

Sperotto, E. et al, Dalton Trans., 2010, 39, 10338-10351.*
(Continued)

*Primary Examiner* — Alexander Usyatinsky
(74) *Attorney, Agent, or Firm* — Berggren LLP

(57) ABSTRACT

The present disclosure relates to aqueous all-copper redox flow batteries. This battery comprises at least one first and second half-cell compartments including the first and second aqueous electrolyte solutions comprising a copper compound and supporting electrolytes and a first and second electrodes. The battery further comprises external storage tanks for the electrolytes residing outside of the half-cell compartments, and means for circulating the electrolytes to and from the half-cells. There is a separator between the first and the second half-cell, and the half-cells of this battery are configured to conduct oxidation and reduction reactions for charging and discharging the battery.

16 Claims, 13 Drawing Sheets

(51) Int. Cl.
    *H01M 8/04276*    (2016.01)
    *H01M 8/20*       (2006.01)
    *H01M 8/2465*     (2016.01)

(52) U.S. Cl.
    CPC ............ *H01M 8/188* (2013.01); *H01M 8/20*
              (2013.01); *H01M 8/2465* (2013.01); *Y02E*
                                        *60/528* (2013.01)

(56) References Cited

OTHER PUBLICATIONS

Kratochil et all. J. Electrochem. Soc., 1974, 121, 851-854.*
Lloyd, David et al., "The development of an all copper hybrid redox flow battery using deep eutectic solvents", Electrochimica Acta, Elsevier Science Publishers, Barking, GB, vol. 100, Mar. 31, 2013, pp. 18-23, XP028544142, ISSN: 0013-4686, DOI: 10.1016/J.ELECTATA.2013.03.130.
Kratochvil, B. et al., "A Secondary Battery Based on the Copper(II)-(I) and (I)-(0) Couples in Acetonitrile", Journal of the Electrochemical Society, vol. 121, No. 7, Jul. 1974, pp. 851-854.
Peljo, P. et al., "Towards a thermally regenerative all-copper redox flow battery", Royal Society of Chemistry, PCCP, vol. 16, Dec. 2013, pp. 2831-2835, DOI: 10.1039/c3cp54585g.
Porterfield, W. W. et al., "Room Temperature Fused Salts: Liquid Chlorocuprates(I)", In: King, B. R. (ed.): "Inorganic Compounds with Unusual Properties", ACS Publications, Washington, D.C., 1976, p. 104.
Sanz, L. et al., "The effect of chloride ion complexation on reversibility and redox potential of the Cu(II)/Cu(I) couple for use in redox flow batteries", Journal of Power Sources, vol. 224, 2013, pp. 278-284.

* cited by examiner

AQUEOUS ALL-COPPER REDOX FLOW BATTERY

PRIORITY

This application is a U.S. national application of PCT-application PCT/FI2015/050166 filed on Mar. 13, 2015 and claiming priority of U.S. provisional application 61/952,156 filed on Mar. 13, 2014, the contents of all of which are incorporated herein by reference.

FIELD

The present disclosure relates to energy storage with redox flow batteries, more specifically to aqueous all-copper batteries.

BACKGROUND

The growing demand for electricity expected during the coming decades has increased interest in the development of new technologies for energy production from renewable power sources, such as wind and solar. However, the success of these new renewable power sources needs to be coupled with the introduction of competitive energy storage devices for load-leveling and peak-shaving such that these renewable sources could be tied to the grid. In this fashion, the problem of the unpredictable and intermittent energy production behavior of renewable power sources may be overcome. For electrical energy storage, electrochemical devices such as batteries and supercapacitors have been shown to provide higher efficiencies compared to other energy storage systems currently utilized.

Reduction-oxidation i.e. Redox Flow Batteries (RFBs) store electrical energy in a chemical form and subsequently dispense the stored energy in an electrical form via a spontaneous reverse redox reaction. A redox flow battery is an electrochemical storage device in which an electrolyte containing one or more dissolved electro-active species flows through a reactor cell where chemical energy is converted to electrical energy. Alternatively, the discharged electrolyte can be flowed through a reactor cell such that electrical energy is converted to chemical energy. The electrolytes used in flow batteries are generally composed of metal salts dissolved in a solvent that are stored in large external tanks and are pumped through each side of the cell according to the charge/discharge current applied. Externally stored electrolytes can be flowed through the battery system by pumping, gravity feed, or by any other method of moving fluid through the system. The reaction in a flow battery is reversible, and the electrolyte can be recharged without replacing the electroactive material. The energy capacity of a redox flow battery is therefore related to the total electrolyte volume, such as the size of the storage tank. The discharge time of a redox flow battery at full power also depends on electrolyte volume and often varies from several minutes to many days.

Within the wide variety of electrochemical devices for energy storage, redox flow batteries are one of the best options for massive storage due to their higher capacity in comparison with other battery technologies. RFBs typically employ two soluble redox couples at high concentrations in aqueous or organic media which are stored in two external tanks and pumped into an electrochemical reactor, where one of the species of the redox couple is transformed into the other, storing or delivering electrons depending upon whether the device is charging or discharging. The electrochemical reactor may be composed of a stack of two-electrode cells. The two electrodes are typically composed of graphite bipolar plates and carbon felts. These electrodes are separated by an ionic exchange membrane, such as Nafion, to avoid mixing of the positive and negative half-cell electrolytes.

Many types of RFBs have been widely explored since the first appearance of the Fe—Cr flow cell in 1973, including hybrid systems and chemically regenerative redox fuel cells. However, only the iron-chromium, all-vanadium (VRB), zinc-bromine and sodium-polysulfide (PSB) cells have come close to full-scale commercialization. At this point, the reduction of cost of the different materials employed in the electrodes, the membranes and the electrolyte is mandatory to promote the introduction of RFBs in the worldwide market.

All-copper redox batteries have been previously reported based on acetonitrile in the articles by B. Kratochvil and K. R. Betty, J. Electrochem. Soc., 121 (1974) 851-854 and P. Peljo, D. Lloyd, N. Doan, M. Majaneva, K. Kontturi, PCCP, 16 (2014) 2831-2835, ionic liquids in the article by W. W. Porterfield, J. T. Yoke, Inorganic Compounds with Unusual Properties, ACS Publications, Washington, D.C., p. 104, 1976 and deep eutectic solvents in the article by D. Lloyd, T. Vainikka and K. Kontturi, Electrochim. Acta, 100 (2013) 18-23. However, the currents supported by these systems remain fairly low.

The article by L. Sanz, J. Palma, E. Garcia, M. Anderson, J. Power Sources 224 (2013) 278-284 discloses a study of the degree of electrochemical reversibility of the Cu(I)/Cu(II) redox couple in chloride media at 1M concentration of copper. Only the positive half-cell reaction is discussed. It was found that the values of peak potential separations of this couple were comparable to those displayed by vanadium redox couples, showing a quasirreversible behavior. In addition, a noticeable displacement of the formal potential of the Cu(I)/Cu(II) redox couple towards much more positive values was observed, reaching the experimental potential displayed by the Fe(III)/Fe(II) redox couple, which has also been widely employed in flow cells, for instance in a hybrid all-iron configuration and more recently in the Fe—V RFB.

The problem of low currents encountered in the known all-copper systems needs to be solved before the all-copper system is ready for industrial scale application. Moreover, the cross-contamination over the cell membranes arising from using dissimilar elements for the two electrode reactions is a concern as it degrades the stability and shortens the life cycle of the present RFBs.

There is still a need for an affordable industrial scale redox flow battery design which is able to provide technically useful energy efficiency while using cost-effective cell materials. Moreover, the operation of the battery should be environmentally and occupationally safe and readily up-scalable.

SUMMARY

The object of the present disclosure is to provide an alternative low cost RFB.

A further object of the present disclosure is to provide an RFB comprising redox couples the materials of which are abundant, non-toxic and highly soluble in water.

Ideally, the aim would be to provide a redox potential close to the anodic and cathodic limits of the operational potential window of the supporting electrolyte, which should be highly conductive and simple to recycle.

A yet further object of the present disclosure is to provide an RFB capable of offering efficiencies suitable for industrial scale design and utilization.

In the present disclosure, the redox processes of copper species are applied in an aqueous all-copper redox flow battery design, where the three oxidation states of copper are present in a hybrid redox flow configuration. The employment of the same element in both half cells reduces the problem of cross-contamination across the membrane, allowing the use of simple and cheap microporous separators.

The first aspect of the present disclosure provides an aqueous all-copper redox flow battery as depicted by claim 1.

In the aqueous all-copper RFB of the present disclosure the chemistry of the $Cu^0$—$Cu(I)$-$Cu(II)$ system is employed to store and deliver electricity within the battery, according to equations 1 and 2:

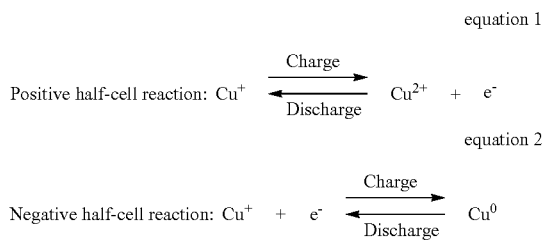

equation 1

Positive half-cell reaction: $Cu^+ \underset{Discharge}{\overset{Charge}{\rightleftarrows}} Cu^{2+} + e^-$ equation 2

Negative half-cell reaction: $Cu^+ + e^- \underset{Discharge}{\overset{Charge}{\rightleftarrows}} Cu^0$ The fresh electrolyte is transformed into oxidized state in the positive half-cell and electrodeposited as copper on the negative electrode surface during charging. Therefore, during discharging, the cupric ions formed in the positive half-cell electrolyte are transformed again to cuprous ions, while stripping of the copper deposit occurs in the negative side.

The potential difference between these two kinetically facile reactions in the disclosure of the present design is from about 0.6 to about 0.7 V which is in conformity with earlier published results.

The cell potential of the aqueous all-copper system of the present disclosure is low compared to RFB chemistries typically used, such as the well-known all-vanadium or Zn—Br systems. However, the present disclosure shows that the excellent kinetics and the simplicity i.e. no catalyst or ion-exchange membrane is required, of the all-copper system of the present disclosure coupled with the high concentrations of electroactive species that are achieved in aqueous media, make this system equally attractive in terms of energy density, energy efficiency and cost per unit of energy (Wh) stored. The power density of the all-copper system of the present disclosure is adequate for an industrial scale application from an economic point of view. The simplicity and the low cost of the materials employed are expected to offset at least part of the cost of a larger stack. For example, the combined use of Nafion membranes and vanadium in a typical all-vanadium RFB is uneconomical thus lowering the attractiveness of disclosure simple separators may be used, which typically cost 20 to 100 times less than ion exchange membranes. Simpler separators such as microporous membranes are better suited to mass-production processes, as they can be applied directly during cell assembly without the need for pretreatment and are available in roll formats which can be over a meter wide and 1000 meters long. Due to their primary application as components in lead-acid batteries, their usable service life in energy storage applications is also well documented.

In the system of the present disclosure, due to the relatively small cell potential the redox processes of equations 1 and 2 are both favored over the chlorine and hydrogen evolution processes, therefore no gas evolution is likely. This is an important simplification and both eliminates the need for electrolyte balancing mechanisms and safely allows deeper cycling over the entire state-of-charge (SOC) range.

Crucially, compared to the dominantly used element, vanadium, copper is abundant, less toxic and is readily obtainable at extremely high purity. Due to the use of three oxidation states preparation of electrolytes is also trivial. In the discharged state the electrolytes in both half-cells may be identical and these can be prepared by simply reacting an electrolyte containing any ratio of $Cu(II)$ to $Cu(I)$ with $Cu^0$.

In addition, no catalysts are required since the kinetics of the reactions are impressive on carbon materials. This not only reduces the cost of the system, it also simplifies production by eliminating additional catalyst application steps. Finally, this also makes the long-term performance of the cell simpler to predict, as the problem of catalyst poisoning or other processes which may cause a long-term failure of a catalyst are avoided.

Finally, the heat exchanger of the vanadium system is eliminated since no complications with the stability of the electrolytes is found over a wide range of temperature, such as from 5 to 70° C.

The electrolytes can be readily recycled in widespread industrial processes such as electrowinning, Hydrocopper® or copper etching. In these processes copper solutions with a similar chemistry are used and waste electrolyte can be directly sent to the same treatment facilities to recover copper. Therefore, the initial investment in the electrolyte can be easily recovered at the end of the life of the battery. By comparison in more exotic chemistries, such as the zinc bromine RFB, there are no existing industrial processes suited to directly treat waste electrolytes and under the battery directive of the EU the manufacturer will be obliged to develop their own waste electrolyte management systems.

DETAILED DESCRIPTION

Figure 1A:
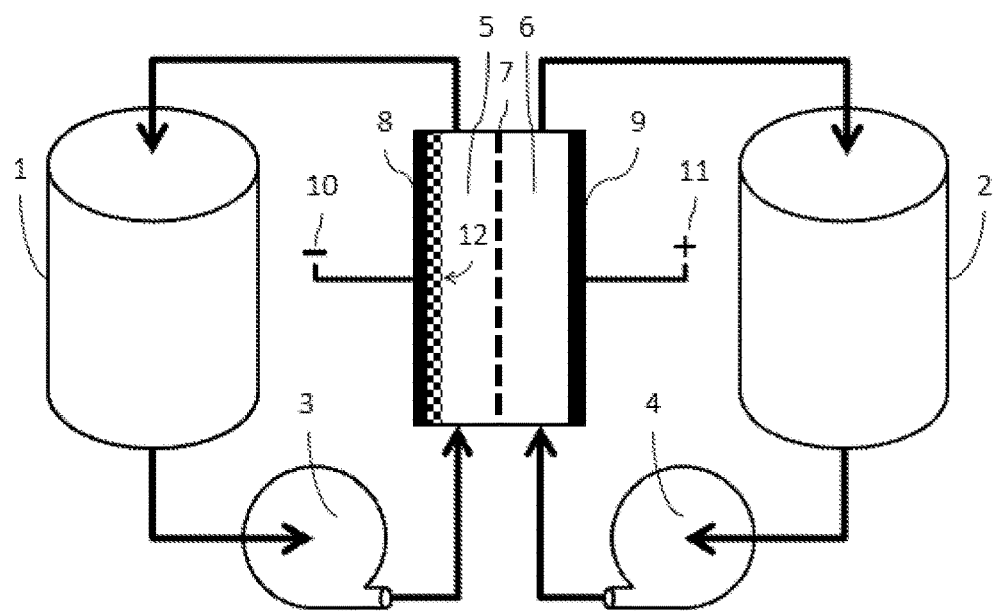
FIG. 1A depicts an example of an RFB configuration according to the present disclosure.

By the term cell is meant the minimal unit that performs the electrochemical energy conversion. A cell is typically divided to form two half-cells by a separator.

A device that integrates several cells, coupled electrically in series or parallel, to get higher current or voltage or both, is referred to as battery. The term battery may refer to a single electrochemical cell or a plurality of electrically coupled cells i.e. stacked cells. These cells may be stacked together in a flow battery system to achieve the desired power output. The terms cell and battery may be used interchangeably herein.

By the term all-copper is meant a cell employing the two cell reactions shown in equations 1 and 2. That is, a cell where the electrode reactions in the negative and positive half-cells are respectively:
1. The redox reaction at the negative electrode is the reduction of $Cu^+$ to form $Cu^0$ (metallic copper) during charging and the oxidation of $Cu^0$ to form $Cu^+$ during discharge
2. The redox reaction at the positive electrode is the oxidation of Cu+ to form Cu2+ during charging and the reduction of Cu2+ to form Cu+ during discharge By the term separator is meant any material which minimizes mixing of the two half-cell electrolytes, while still allowing sufficient transfer of ionic species between the two half-cells to allow electrical current to pass through the cell.

By the term supporting electrolyte is meant any chemical species which can be dissolved in the solvent used in the battery to form ionic species that will enhance ionic transport of current between the two electrodes in the cell, without itself undergoing redox reactions at either electrode during normal operation. The supporting electrolyte can also function as a source of ligands to improve the solubility of copper, increase the cell potential or enhance the kinetics of the redox reactions.

The present disclosure provides an aqueous all-copper redox flow battery. This battery comprises the following parts:

(i) At least one first half-cell compartment including the first aqueous electrolyte solution comprising a copper compound and a first supporting electrolyte and a negative, first, electrode, (ii) at least one second half-cell compartment including the second aqueous electrolyte solution comprising a copper compound and the second supporting electrolyte and a positive, second, electrode, (iii) the first external storage tank for the first electrolyte residing outside of the first half-cell compartment, (iv) the second external storage tank for the second electrolyte residing outside of the second half-cell compartment, (v) means for circulating the electrolytes to and from the half-cells, (vi) a separator between the first and the second half-cell, separating the half-cell solutions from each other.

These half-cells are configured to conduct oxidation and reduction reactions for charging and discharging this battery.

In an exemplary embodiment in the battery of the present invention the first electrolyte and the second electrolyte are initially the same i.e. the electrolyte solutions are at the initial 0% state-of-charge identical solutions. This simplifies the preparation of the tank solutions by requiring the preparation of only a single electrolyte solution, which in turn is simple to prepare since any mixture of Cu(I) or Cu(II) compounds can be dissolved in a supporting electrolyte solution and then reacted with metallic copper to spontaneously form a solution containing only Cu(I) and optionally trace amounts of Cu(II). This reaction is essentially the same as takes place in the battery during discharge.

In an exemplary embodiment of the battery of the present invention the first electrolyte and the second electrolyte comprise at the initial 0% state-of-charge essentially of the $Cu^+$ ion in electrolyte solution, optionally only negligible $Cu^{2+}$ ions are present. By trace amount or negligible concentration is preferably meant a concentration of less than 0.01 M of $Cu^{2+}$ ions.

In an exemplary embodiment in the battery of the present invention the copper compound of the first electrolyte and/or the second electrolyte comprise(s) copper salt, preferably copper halide salt, more preferably copper chloride salt.

In an exemplary embodiment in the battery of the present invention the first electrolyte and the second electrolyte may be prepared by adding thereto metallic Cu. Especially, as due to contamination of the used $Cu^+$ precursor the electrolyte solution may contain traces of $Cu^{2+}$ or residual oxygen due to the preparation process may cause oxidation, it is advantageous to add some metallic Cu to provoke the spontaneous comproportion reaction of $Cu^{2+}$ to Cu. Preferably, the metallic Cu is in the form of a fine powder, such as commercially available copper powder. Most preferably the copper powder has the grain size less than 425 μm, and greater than 99.5% purity on a trace metals basis which may be provided by e.g. Sigma-Aldrich.

In an exemplary embodiment the first electrolyte and the second electrolyte of the battery of the present invention further comprise halide ligands, forming the supporting electrolyte. In the battery, the first supporting electrolyte and/or the second supporting electrolyte comprise(s) halide salts other than copper halide salts. These salts, especially chloride salts, are most appropriate complexing agents for copper and the complexes can be solubilized at very high concentrations in aqueous media. Preferably chloride salts, more preferably sodium chloride, potassium chloride, lithium chloride, ammonium chloride, magnesium chloride, hydrogen chloride and calcium chloride, most preferably hydrogen chloride and calcium chloride, are used to form the halide-rich supporting electrolyte. The used electrolyte is low cost, the most preferred electrolyte of hydrogen chloride or calcium chloride is simple to prepare and easy to recycle. Most preferably the supporting electrolyte comprises hydrogen chloride to stabilize the pH.

The halide concentration of the electrolyte solutions is preferably from 4 to 20 M, more preferably 8 to 15 M, such as from 8 to 10 M. This concentration is suitably obtained by dissolving cuprous chloride (CuCl) and a suitable supporting electrolyte into water. Due to the high halide content, especially chloride content, the monovalent copper ion ($Cu^+$) is stabilised and copper can efficiently undergo the two redox reactions, with a separation in the redox potentials of about 0.65 V.

The copper content of the fresh or 0% SOC electrolyte solution is preferably from 1 to 4 M, more preferably from 2 to 3 M. The high amount of copper due to use of high copper solubility precursors aids in offsetting the relatively low cell potential, preferably about 0.6 V.

The Cu:Cl ratio is preferably at least 1:3 to ensure that as large cell potential as possible is achieved.

The pH of the electrolyte is preferably no greater than 2, more preferably no greater than 1.5, to prevent the formation of insoluble $Cu(OH)_2$ species.

To utilise these reactions a cell, or collection of cells as depicted below, needs to be constructed from suitable inert electrode materials and separators.

In an exemplary embodiment the first electrode and the second electrode in the battery of the present invention are made of inert materials. The role of the inert electrodes is to provide a surface where the reactions can take place and to conduct electrons transferred in these reactions either to the next reaction site or to an external circuit.

In another exemplary embodiment, where two cells are arranged in a stack the second electrode of the first cell and the first electrode of the second cell are opposite faces of single bipolar plate of inert material, and therefore the electrical current passes between the two cells directly through the bipolar plate.

Preferably, the first electrode and the second electrode are selected from the group consisting of platinum; titanium; stainless steel; carbon-polymer composites, such as carbon black-polymer composites, expanded graphite—polymer composites for example sigracet from SGL Carbon; and plain carbon, or any combinations thereof. More preferably the electrodes are made of carbon, such as glassy carbon, glassy carbon carbon-paste, graphite or expanded graphite foils. The use of metallic electrodes is typically limited in commercial applications due to long-term corrosion issues, especially with materials such as stainless steel. This problem becomes particularly pronounced when a stack with bipolar electrodes is to be built.

In an exemplary embodiment the material of said separator is selected from the group consisting of microporous separators, preferably silica-PVC (poly vinyl chloride) composite or silica PE (poly ethylene) composite. Alternatively selective anion or cation conducting materials may be used such as ion exchange membranes, preferably Nafion; ion-conducting ceramics, preferably lithium-ion conducting ceramics. Most preferred materials are microporous or nanoporous materials due to the their attractive performance to cost ratio.

The role of the separator is to prevent mixing of the electrolytes in the two half-cells and spontaneous discharge of the cell due to $Cu^{2+}$ reacting with Cu. The separator materials are most preferably selected from microporous materials developed for lead-acid battery applications and well known, such as commercial polymer-silica composites such as Amersil or Daramic.

The operational temperature of the battery of the present disclosure may be elevated for enhancing the performance of the battery. Preferably, the temperature of said first and second electrolyte is at least 50° C. to avoid passivation of the copper deposit during discharge. More preferably the temperature is at least 55° C., most preferably at least 60° C., during operation of the battery. At higher temperatures improved solubility and better conductivity and mass-transport is obtained. The elevated temperature requirement is well suited with the target application, since typically significant engineering effort and cost is required to prevent overheating in e.g. VRFBs. In case of the all-copper batteries of the present disclosure an increase in operation temperature is highly beneficial, and on the contrary, desired. There is no need for e.g. heat exchangers to eliminate excess heat generated.

In one embodiment the battery according to the present disclosure is depicted by FIG. 1A. This battery utilises two electrolytes, which are stored in separate external tanks 1 and 2, respectively. The electrolytes are transferred in to the cell using two pumps 3 and 4, respectively. Circulation of the electrolyte solutions is necessary to maintain a sufficient concentration of reagents in the two half-cell chambers i.e. a negative 5 and a positive 6 half-cell which are divided by a separator 7 to prevent the electrolytes from mixing and spontaneous discharge from occurring. The reagents in the two half-cells are reduced or oxidised at the inert negative 8 and positive 9 electrodes during charging. During discharge the reverse occurs, with oxidation and reduction of the reagents occurring at the negative and positive electrodes. The negative and positive electrodes are connected to an external electrical system by negative 10 and positive 11 terminals. In the case of the aqueous all-copper battery according to the present disclosure the redox reaction of equation 1 occurs at the negative electrode. During charging $Cu^+$ in solution is reduced to form metallic Cu, this forms a solid deposit 12 on the inert negative electrode 8. During discharge the metallic Cu deposit is oxidised to form dissolved $Cu^+$ ions. In the all-copper battery the positive electrode reaction of equation 2 takes place. During charging $Cu^+$ is converted to $Cu^{2+}$, during discharge $Cu^{2+}$ is converted back to $Cu^+$.

In principle, the electrolytes in both half-cells and storage tanks are identical solutions of pure $Cu^+$ when the battery is fully discharged.

Figure 1B:
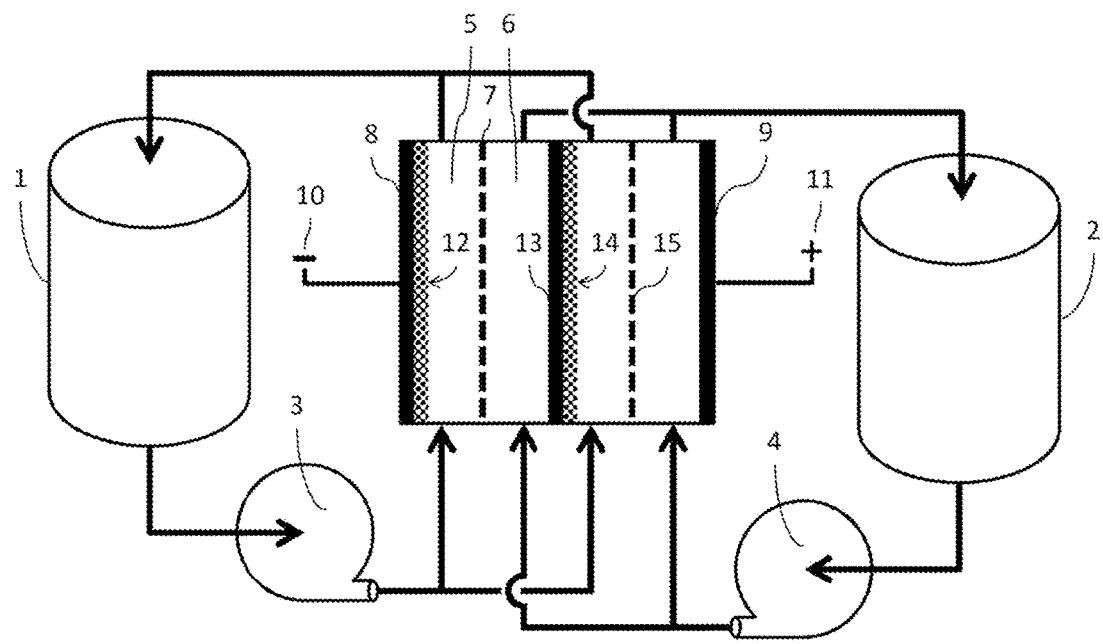
FIG. 1B depicts another example of an RFB configuration according to the present disclosure.

In another embodiment of the present disclosure, the plurality of cells i.e. a flow battery stack according to FIG. 1B is used. This operating concept is similar to the single cell configuration of FIG. 1A. The same tanks 1 and 2 and pumps 3 and 4 are present. The stack is still connected to the negative 10 and positive 11 terminal of an external electrical system by a negative 8 and positive 9 electrode located at the ends of the stack. However, the stack now consists of two cells connected in series, by a common central electrode 13 operating in a bipolar configuration. On the left-hand side of this bipolar electrode 13 reaction according to equation 2 takes places, on the right-hand side reaction according to equation 1 takes place and a copper deposit 14 is formed. The total current passing through each electrode is constant over the entire stack. In this configuration the voltage of the stack, as measured at the negative 10 and positive 11 terminals is that of the basic cell of FIG. 1A multiplied by the number of cells. For the specific configuration of FIG. 1B the cell voltage of the basic concept shown in FIG. 1B is doubled.

Figure 1C:
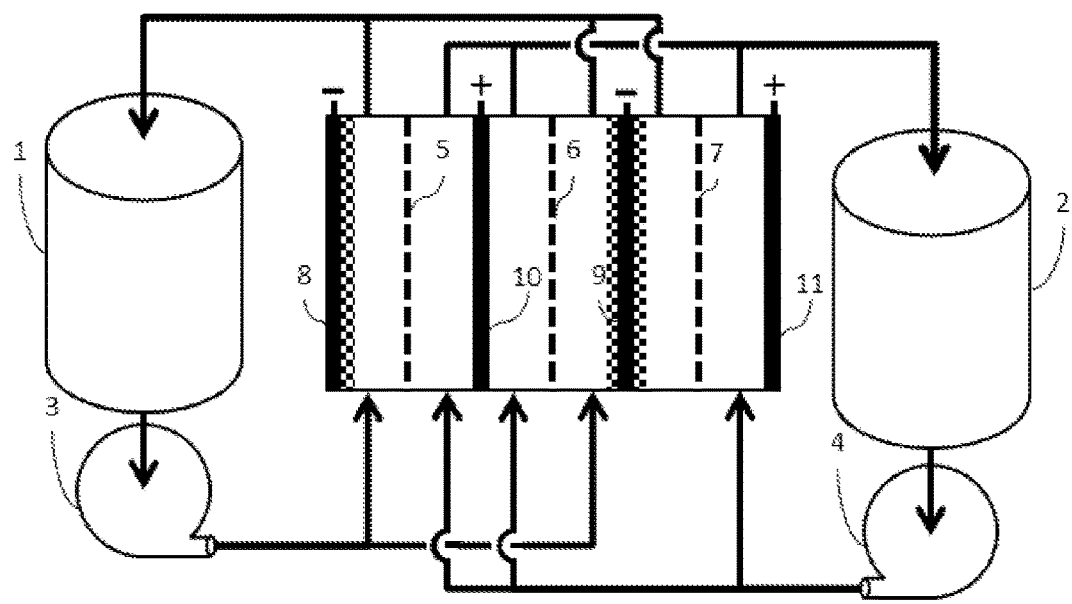
FIG. 1C depicts yet another example of a stacked RFB configuration according to the present disclosure.
Figure 10:
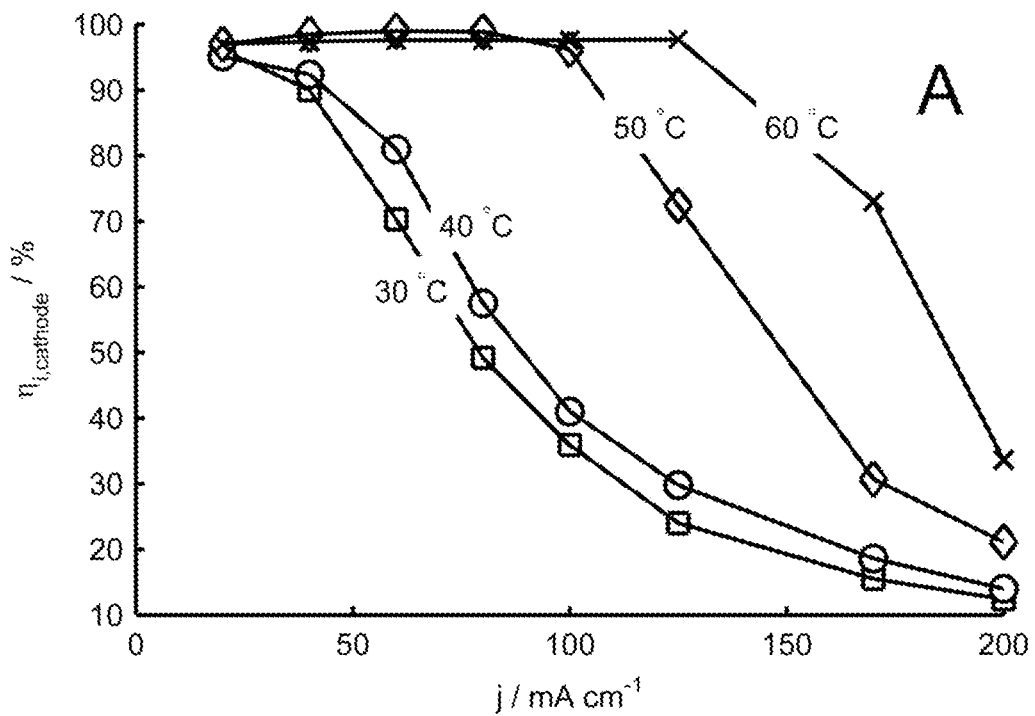
FIGS. 10A and B show the dependency of current efficiency and density of the deposition and stripping reaction at a platinum and glassy-carbon electrodes respectively.
Figure 10:
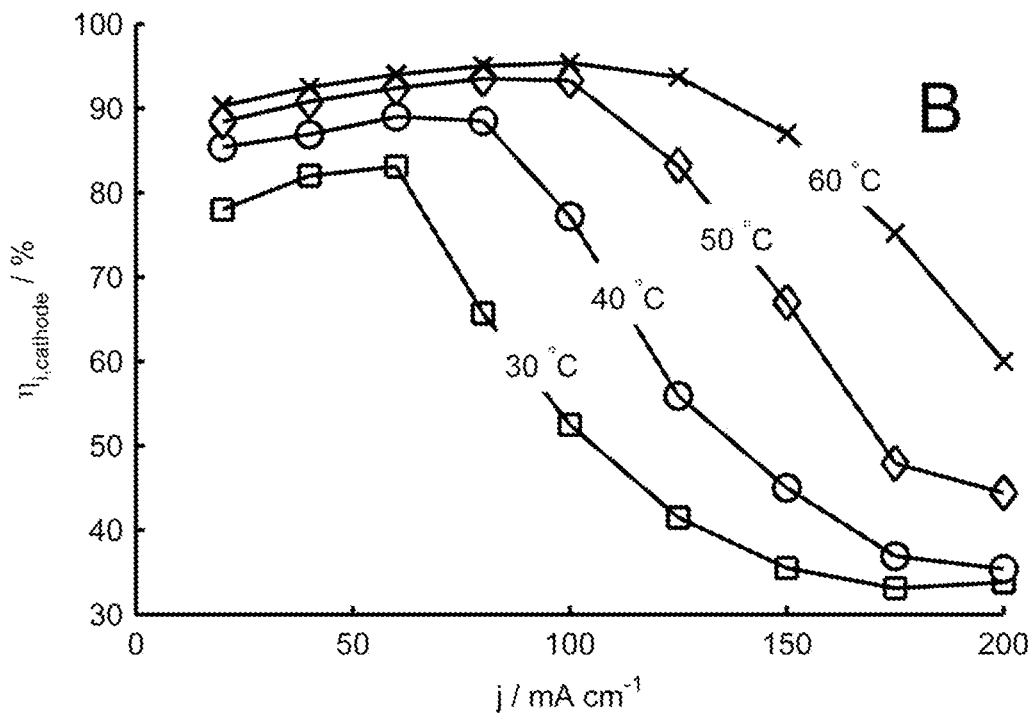

In a yet further embodiment of the present disclosure according to FIG. 1C a third possible configuration i.e. stacked configuration is depicted. In this configuration the electrolytes in the storage tanks 1 and 2 are again circulated by means of pumps 3 and 4. However, the electrochemical reactions take place at an array of monopolar electrodes. Each negative electrode 8 and 9 or positive electrode 10 and 11 is connected to a common negative or positive bus bar respectively (not shown). The negative and positive bus bars are connected in turn to the negative and positive terminals of an external electrical system. A total of three cells are shown in the FIG. 10, the voltage difference between each positive and negative electrode in the array is constant and the same as in the single-cell concept of in FIG. 1A. The current is proportional to the number of cells and hence three times higher compared to FIG. 1A. The currents in the two outermost electrodes 8 and 11 will be the same as those of FIG. 1A, while the two central electrodes will experience currents that are twice as high.

In an exemplary embodiment the present disclosure provides a battery which comprises a plurality of stacked cells the number of which is from 2 to 1000. Preferably, the cell number is at least 20 for obtaining a voltage of about 12 V; and preferably it is 200 or less, which set have been tested and found functional.

The voltage efficiency is improved by using a stacked configuration in the flow battery. An area specific resistance (ASR) of less than 1.6 $\Omega cm^2$ is obtained which is significantly lower than the values reported during initial development work on the VRFBs. Even lower values may be obtained by optimizing the electrodes and increasing surface areas thereof.

The battery of the present disclosure is able to provide an outstanding current efficiency for both electrode processes, even under extreme conditions of high current density and acidity. The round trip current efficiency of at least 90%, preferably at least 95%, such as 98%, is obtainable when cycling the battery at a current density of 150 mA cm$^2$.

The energy efficiency of the battery of the present disclosure is at least 70%, preferably at least 72%.

The energy density of at least 20 Wh/l achieved with the design of the present disclosure is comparable to traditional vanadium redox flow batteries.

In an exemplary embodiment a round trip energy efficiency of 72% is obtained for the aqueous all-copper battery of the present disclosure at a current density of 40 mA cm$^{-2}$, which is similar to values reported for zinc-bromine redox flow batteries.

In one aspect the present disclosure provides the use of the aqueous all-copper redox flow battery as depicted above for storing electrical energy in chemical form and dispensing stored energy in electrical form. In particular, the energy storage is well suited for industrial scale storing operation. Especially, when a stacked cell configuration is applied the energy storage capability fulfills the need for industrial application.

Hereafter, the present disclosure is described in more detail and specifically with reference to the examples, which are not intended to limit the present disclosure.

Examples 1-4

Electrolyte Preparation

The Cu(I) electrolyte used to fill both external storage tanks was prepared from Cu(I) chloride (>99% purity, Acros Organics) salt. The concentration of copper was varied from 1M up to 3M in the different cycling tests. In order to increase the concentration of chloride, calcium chloride (>95% purity, Scharlau) and HCl (37% Panreac) were utilized as mixed supporting electrolyte in both half-cells. The respective concentrations of acid and salt were the same in all the solutions; 2M acid and 4M salt in the electrolytes at 1M and 3M copper concentration respectively. Cuprous ions are easily oxidized by oxygen so the solutions were stirred with mild heating in contact with copper turnings (Fluka, >99.0%) until they became completely colorless, in order to reduce all the cupric ions that could be formed during the preparation of the electrolytes. However, no further procedures are required in the preparation of the electrolytes.

Cell Assembly

The single flow cell according to FIG. 1A was built using a sandwich type flow reactor (Micro Flow Cell, Electrocell) with graphite electrodes of 10 cm$^2$ active area in both half-cells. A platinum wire pseudo reference electrode was placed in the positive half-cell in order to record the overpotentials of each electrode separately. Stainless steel and titanium foils were also tested as electrodes in the negative half-cell, to evaluate their performance as substrates for the electrodeposition of copper. Nanoporous composite separators of PVC-Silica (Amersil S10) were employed. The thickness of the separator was 0.6 mm and the volume of porosity around 70%, with a pore size of 0.08 microns.

Pumps and Storage

The flow rate was controlled by peristaltic pumps (Masterflex L/S Easy Load) and the tubing was made of PVC (Nalgene, 3.6 mm inner diammeter), which is particularly suited for use with concentrated HCl.

The hermetically sealed glass electrolyte external storage tanks were thermostatted using a water bath. Thermometers were inserted inside the tanks to monitor the temperature in the bulk electrolytes. In addition, magnetic stirrers were placed in the tanks to maintain a homogenous mixture of the species. The electrolytes were gently purged with argon before being injected in the tanks. The diffusion of oxygen through the PVC tubing could not be completely avoided during the experiments.

Cycling Tests

Various charge and discharge cycling experiments were performed at constant current after the system had initially been charged from 0 to 50% state-of-charge (SOC). The temperature and the flow rates were varied in order to determine the overpotentials of both the charge and discharge processes over a wide range of current densities. The potential was limited up to 0.9V on charge and down to 0.3V on discharge.

Charge and discharge experiments at constant current were also carried out to study the stability and the degradation of the process over more than 20 cycles. The flow rate was high enough to ensure good convection of species within the cell compartments (35 mL/min) while the volume of the electrolytes was 25 mL in each tank. The current density was 20 mA/cm$^2$ and the duration of the charge cycles was 1 h, thus the SOC was varied by 10% in each cycle from 50 to 60%.

Example 1

Initial voltammetric studies were measured using the same electrolyte (3M CuCl, 4M HCl/CaCl$_2$) and temperature (60° C.) employed during RFB measurements and were performed sequentially with the same electrolyte and electrode. The reference electrode was a copper wire. To simplify interpretation and make the results as accessible as possible, the electrode was only rotated between each measurement to refresh the solution in front of the electrode and was otherwise stationary.

Figure 2:
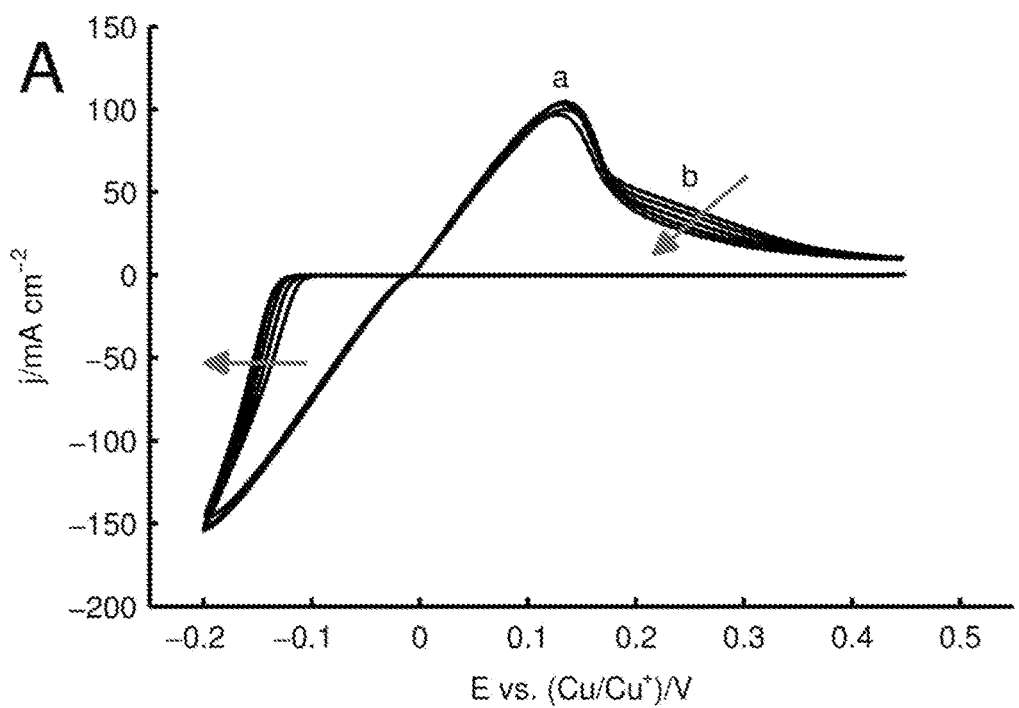
FIGS. 2A and B show cyclic voltametric measurements for the deposition and stripping of copper (A) and the $Cu(I)/Cu(II)$ reaction in a 3M $Cu(I)$ solution (B) respectively.
Figure 2:
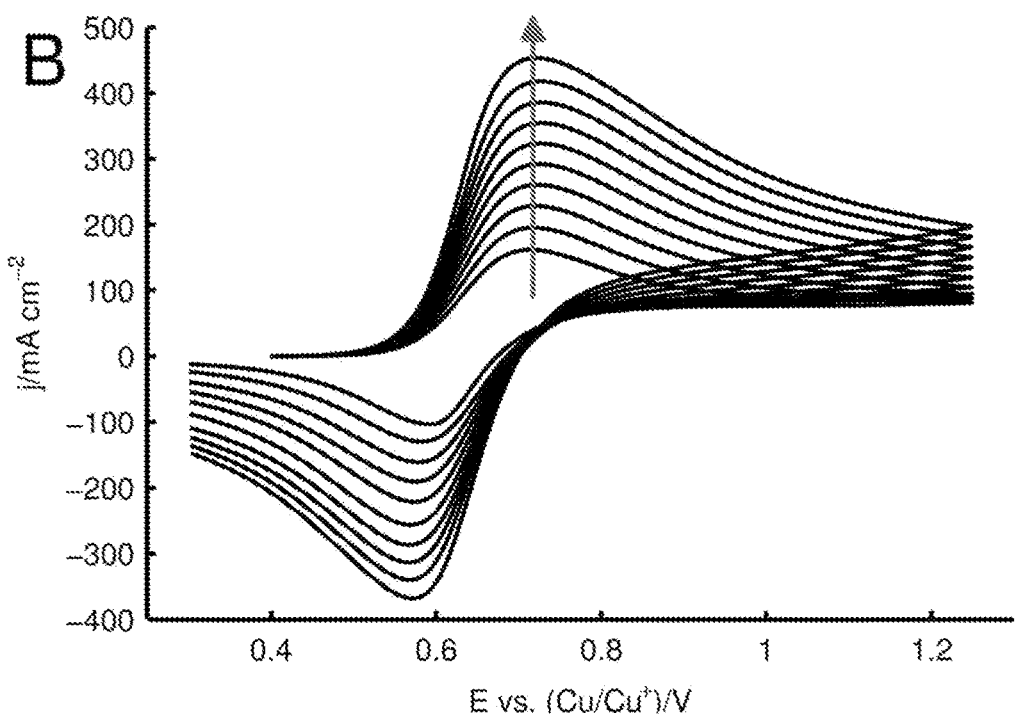

FIGS. 2A and 2B show the Cu(I)/Cu$^0$ and Cu(II)/Cu(I) processes respectively at a GC working electrode (5 mm glassy carbon, Pine Research Instrumentation AFE3T050GC). The figures depict cyclic voltammetric measurements for the deposition and stripping of copper (A) and the Cu(I)/Cu(II) reaction in a 3M Cu(I) solution (B), respectively. The scan rate was varied between 0.2 and 0.02 V/s. For the sake of clarity only every second scan is shown in FIG. 2A. The arrows indicate the direction of increasing scan rate.

Negative Half-Cell Reaction

Around 100 mV of overpotential appears to be required for nucleation of copper deposition on glassy carbon (GC) electrode. Once nucleation occurs, no difference is apparent between the various scan rates used. A slight scan rate dependency during the stripping process can be observed, with a second process apparent at lower scan rates (labelled b in FIG. 2A). This effect indicates that the stripping of copper in chloride containing solutions proceeds through two stages, an initial process to form an adsorbed CuCl deposit on the copper surface, followed by formation of a [CuCl$_2$]$^-$ complex. The limiting current density that can be achieved at the negative electrode during discharge is likely related to either transport limitations for free chloride in solution or the kinetics of CuCl$_2^-$ formation.

The observed current densities during deposition are favorable, considering that in an actual RFB the intended operating current is around 20 mA cm$^{-2}$. When the charge passed during deposition and stripping is integrated the Coulombic efficiency is found to be 85±2%, this indicates parasitic losses. By contrast, when the potential is switched at −0.15 V the Coulombic efficiency increases to 94±2%.

Positive Half-Cell Reaction

FIG. 2B clearly shows that reaction according to equation 1 has facile kinetics. No complicating homogeneous reactions are apparent either. The diffusion coefficient of the Cu(I) complex was determined for each of the anodic peak currents shown in FIG. 2b using the Randles-Sevcik equation and was found to be 1.47±0.03·10$^{-6}$ cm$^2$ s$^{-1}$.

The positive half-cell reaction is separated from the chlorine evolution reaction by around 0.8 Volts, so neither chlorine nor oxygen evolution took place.

Example 2

The influence of the temperature and flow rates was studied over a wide range of current densities.

Temperature and flow rate conditions are two of the main parameters affecting the performance of the battery during its operation. Hence, it is important to determine preliminary values of these variables where the battery is able to charge and discharge properly at reasonable efficiencies. As a proof of concept of the present disclosure, electrolytes at 1M concentration of CuCl in 2M/HCl/CaCl$_2$ were used in the following experiments. Short charge and discharge cycles of 10 minutes were performed after an initial pre-charge to reach a 50% SOC in the electrolytes, varying the flow rate and the current densities at 40 and 60° C.

Figure 3A:
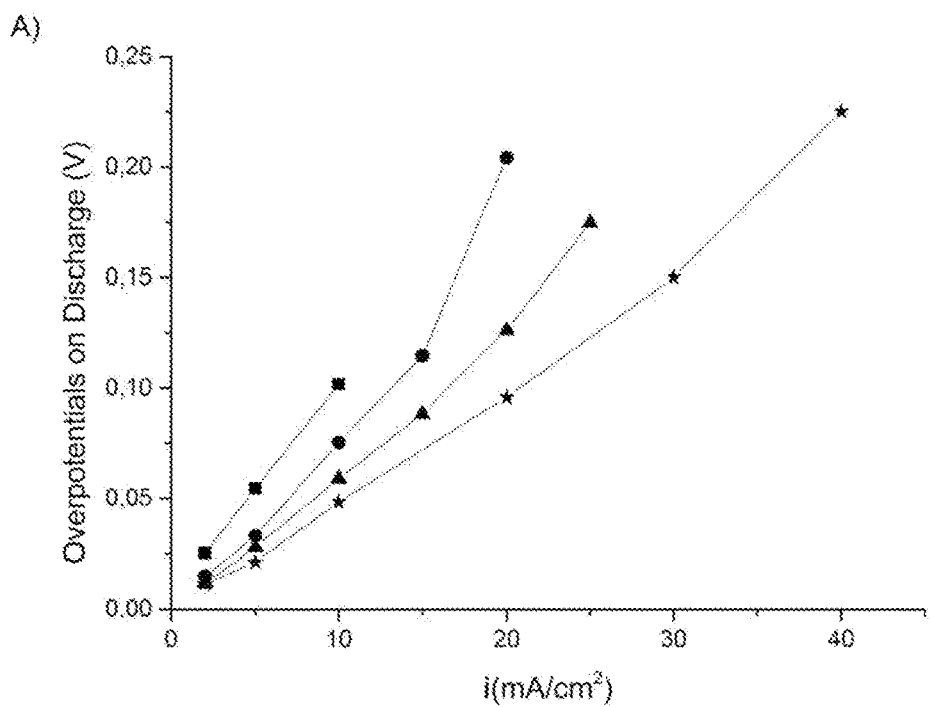
FIGS. 3A and B depict the magnitude of the overpotentials over a range of current densities from 2 to 60 mA/cm² at temperatures of 40° C. and 60° C. respectively.
Figure 3B:
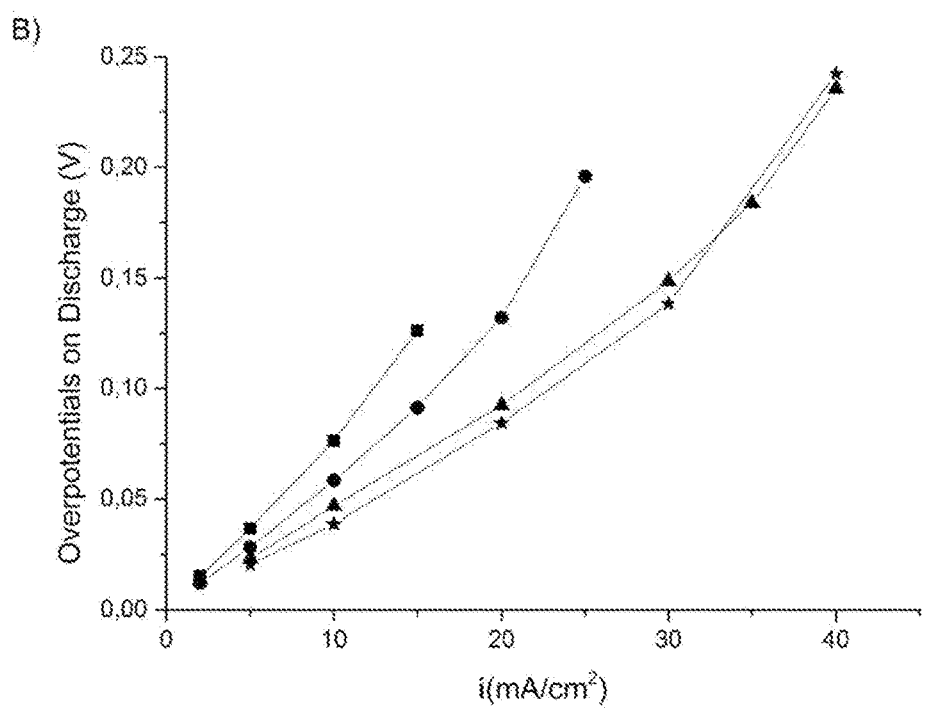

The magnitude of the overpotentials, either in charge and discharge, over a range of current densities from 2 to 60 mA/cm$^2$ is shown in FIGS. 3(A and B). Figures depict overpotentials on discharge of the All Copper RFB; Electrodes: Graphite; Electrolyte: 1M CuCl/2 M CaCl2/2M HCl; Separator: Amer-Sil S10; Flow Rate: (square) 14 mL/min; (circle) 35 mL/min; (triangle) 70 mL/min; (star) 140 mL/min; A) T=40° C.; B) T=60° C.

These overpotentials represent the difference between the open circuit potential (OCP) of the cell before a charge/discharge step and the potential of the cell during that charge/discharge step. Also the effect of the temperature and flow rate can be observed. These two parameters directly affect the performance of the cell, since the overpotentials are notably decreased when these variables are increased during the operation of the flow battery. At a fixed temperature, the current density that can be applied in the system increases as the flow rate is higher due to an improvement in the convection inside the reactor.

An increase in temperature also allows the use of higher current densities at lower flow rates, which is important to minimize the power consumption of pumps. At 60° C. current densities around 20 or 30 mA/cm$^2$ can be easily applied while the overpotentials are not so important at reasonable flow rates.

Figure 4A:
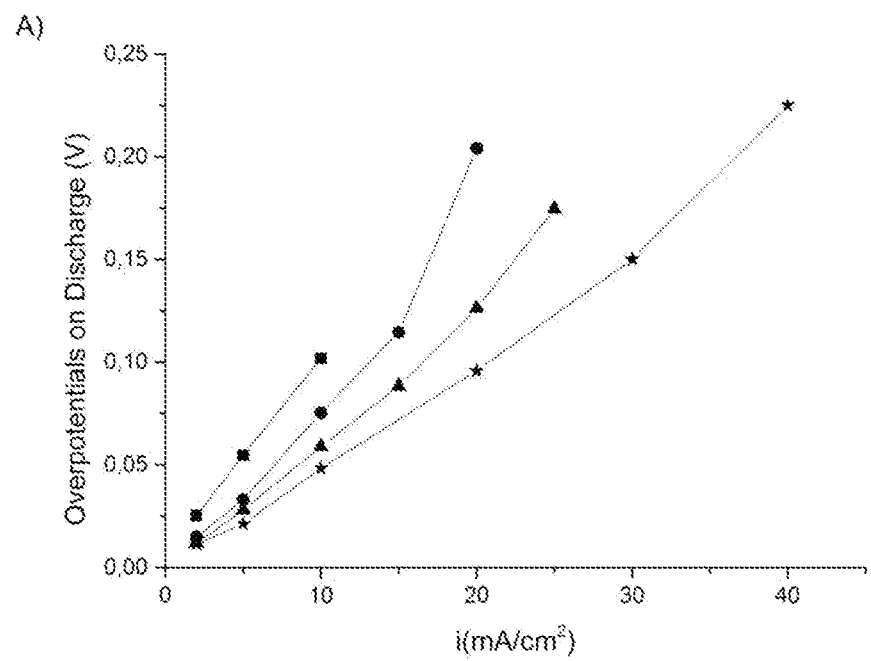
FIGS. 4A and B display the overall energy efficiencies at 40° C. and 60° C.
Figure 4B:
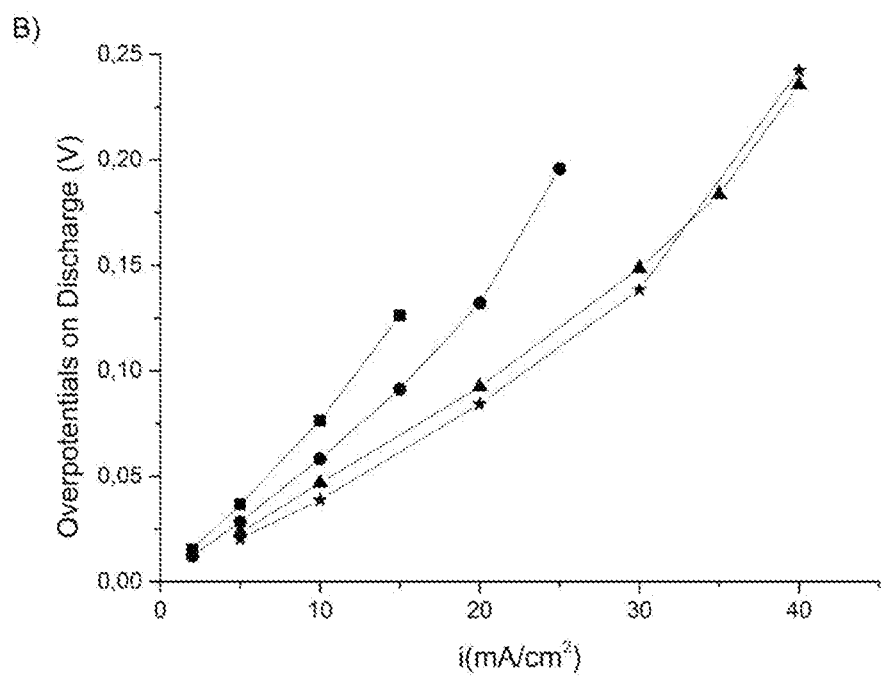

The overall energy efficiencies displayed in FIGS. 4(A and B) are close to 100% at low current densities of 2 mA/cm$^2$ and independent of the magnitude of the flow rate. The figures depict Influence of temperature and flow rate on the Energy Efficiencies of the All Copper RFB; Electrodes: Graphite; Electrolyte: 1M CuCl/2 M CaCl$_2$/2M HCl; Separator: Amer-Sil S10; Flow Rate: (square) 14 mL/min; (circle) 35 mL/min; (triangle) 70 mL/min; (star) 140 mL/min; A) T=40° C.; B) T=60° C.

However it considerably diminishes with a ten-fold increase in the current density indicating the operational limits of the current configuration of the RFB.

Example 3

The effect of temperature was studied on cycling stability tests. The voltage efficiency (VE) of the system at 1M concentration of copper species is around 70% at 40° C. and slightly higher at 60° C., where 80% can be achieved, as can be shown in Table 1 which depicts cell potentials of the all copper RFB at different temperatures (i=10 mA/cm$^2$; Flow Rate 35 mL/min).

TABLE 1

| Temperature (° C.) | Ec (V) | OCV (V) | Ed (V) | VE (%) |
| --- | --- | --- | --- | --- |
| 40 | 0.58 | 0.52 | 0.42 | 72 |
| 60 | 0.6 | 0.54 | 0.48 | 80 |

Figure 5:
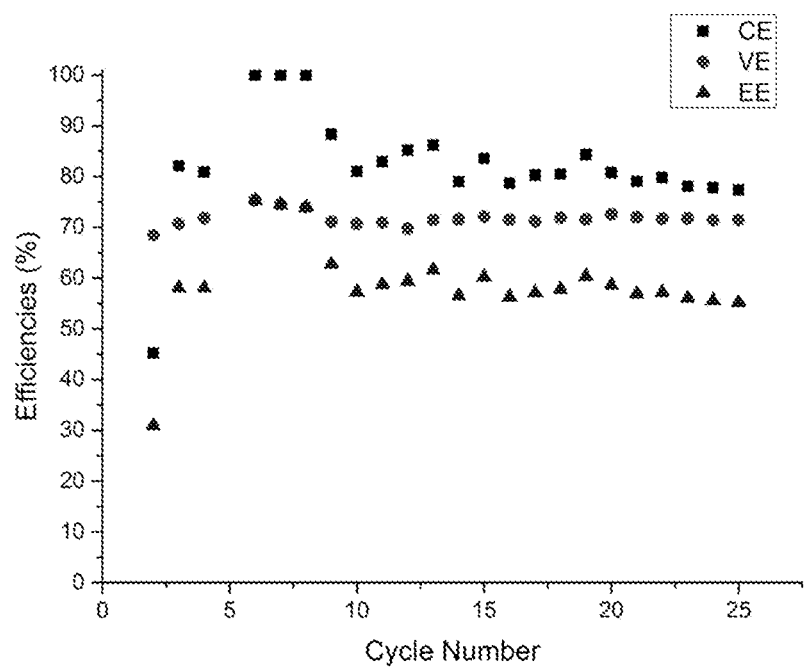
FIG. 5 depicts current efficiency (CE), voltage efficiency (VE) and energy efficiency (EE) of the all-copper RFB at 40° C.

The Coulombic efficiency and therefore, the energy efficiency are dramatically affected by the increase in temperature. At 60° C., the current efficiency (CE) drops to 40% in the third cycle, indicating a rapid capacity loss of the system due to the crossover mentioned previously. Therefore the target values of energy efficiency (EE) and CE are not reached at this temperature. However, at 40° C. the performance of the battery is stable over more than 20 cycles showing CE and EE values around 80% and 60% respectively, as can be observed in FIG. 5 depicting CE, VE and EE of the all-copper RFB at 40° C.; Electrodes: Graphite; Electrolyte: 1M CuCl/2 M CaCl2/2M HCl; Separator: Amer-Sil S10; Flow Rate: 35 mL/min.

The operating temperature not only affects the electrochemical performance of the reactions within the cell, but also the structure and morphology of the copper deposits formed on the negative electrode surface. At 60° C., the copper deposits are more compact and homogeneous with a well-defined pentagonal geometry. The size of the grains ranges from 50-100 microns approximately, based on SEM measurements. At 40° C., the grains are smaller and their shape is not evident since they tend to form aggregates. The size of these aggregates is around 100 microns, or even higher.

Example 4

One of the strategies to increase the current densities than can be applied in this system is the electrode design and architecture. In these experiments, the negative graphite electrode was replaced by a Stainless Steel (A 316) foil and a Titanium foil (>99.6% purity, Goodfellow) without any pre-treatment. The surface area remains 10 cm$^2$. The electrolytes were 25 mL of 3M CuCl/4M HCl/4 M CaCl$_2$ at 40° C. in each tank. The cycling started at an initial SOC of around 50% (pre-charging) at constant current of 20 mA/cm$^2$.

Figure 6:
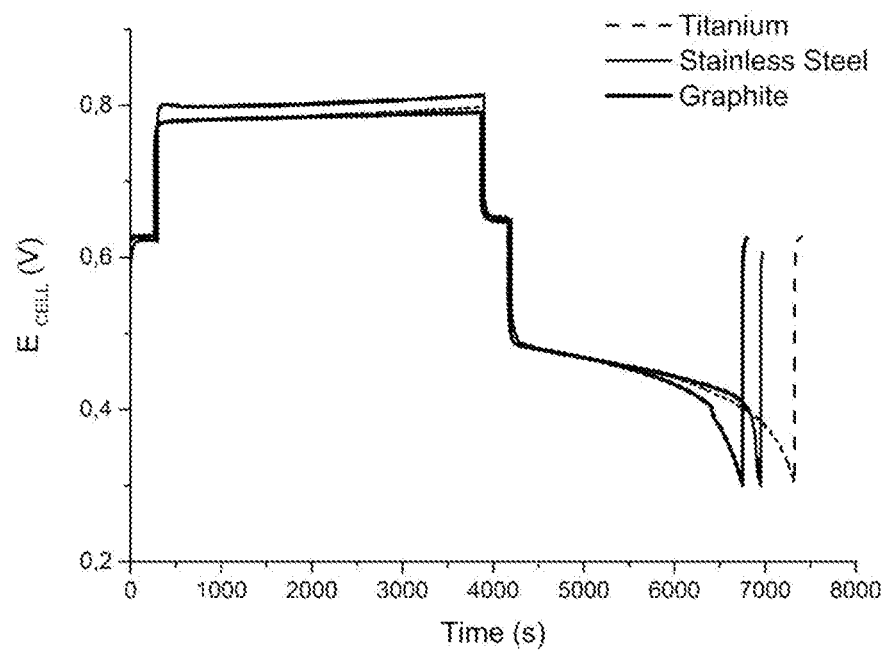
FIG. 6 shows a comparison of charge/discharge cycles of the all copper RFB at [Cu]=3M; [CaCl2]=4M; [HCl]=4M; T=40° C.; i=20 mA/cm²; FR=35 mL/min.

The CE increases due to an improvement of the electrodeposition and stripping processes over metallic surfaces, as can be observed in FIG. 6 showing a comparison of charge/discharge cycles of the all copper RFB at [Cu]=3M; [CaCl$_2$]=4M; [HCl]=4M; T=40° C.; i=20 mA/cm$^2$; FR=35 mL/min.

The charge profiles are very stable in all the cases. However a slight overpotential in charge is observed when stainless steel is used as the negative electrode. This effect is attributed to parasitic corrosion processes, mainly in the contacts, and is minimized on graphite and titanium electrodes.

In Table 2 (the current density was 20 mA/cm$^2$ and the temperature was 40° C.), the current efficiency (CE), voltage efficiency (VE) and energy efficiency (EE) of the three systems are calculated from average values of potential and duration of the charge and discharge cycles and they are compared under the same experimental conditions of temperature, flow rate and current density. The CE clearly improves when metallic electrodes are used, as mentioned before. However, the VE is quite similar in all cases and hence, the overall EE is improved with metallic electrodes due to the higher values of CE.

TABLE 2

| System (T = 40° C.) | i (mA/cm$^2$) | CE (%) | VE (%) | EE (%) |
|---|---|---|---|---|
| βM Graph-Graph | 20 | 70 | 60 | 42 |
| 3M Graph-SS | 20 | 88 | 57 | 47 |
| 3M Graph-Ti | 20 | 90 | 58 | 50 |

Figure 7:
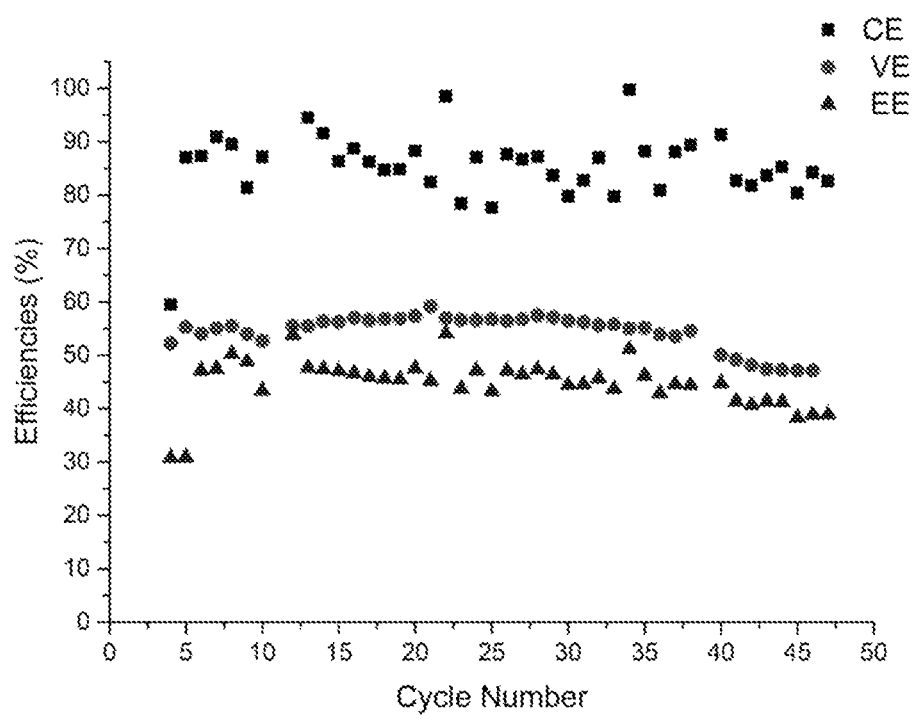
FIG. 7 shows the current efficiency (CE), voltage efficiency (VE) and energy efficiency (EE) of charge and discharge cycles of the all copper RFB at 3M concentration of copper species.

Therefore, the employment of metallic substrates seems to be favorable for the copper electrodeposition process, especially when chemically resistant metals such as titanium are used. However, the performance of ordinary stainless steel is very close to that exhibited by titanium electrodes. The efficiencies of charge and discharge cycles of the all copper RFB at 3M concentration of copper species are displayed in FIG. 7. At 20 mA/cm$^2$ the efficiencies are quite stable over almost 50 cycles and then start to decrease to values of 83% CE, 47% VE and 40% EE.

The low efficiencies are not only attributable to inefficiencies in the chemistry of the system over the long cycling process. Also, the simple design of the reactor, the connections, the diffusion of oxygen through the PVC pipelines and the observable crossover through the separator, limit the efficiencies than can be achieved at a given current density.

Microscope and SEM images of the deposit of copper formed on the surface of the stainless steel electrode after the experiment indicated that the grains are significantly smaller (10-20 microns) than the ones formed on the surface of graphite electrodes and the layer is much more compact. The structure and geometry of the grains are well defined. The morphology of copper deposits directly affects the electrochemical activity and more importantly, the corrosion behavior of this metal in presence of chloride ions. The grain size reduction results in improved physical and mechanical properties such as intergranular corrosion and stress corrosion cracking (SCC). Therefore, the improvement in CE of the flow cell when metallic substrates are used can be also attributed to a higher stability of the copper deposits due to their structure and smaller grain sizes.

Examples 5-9

Figure 8:
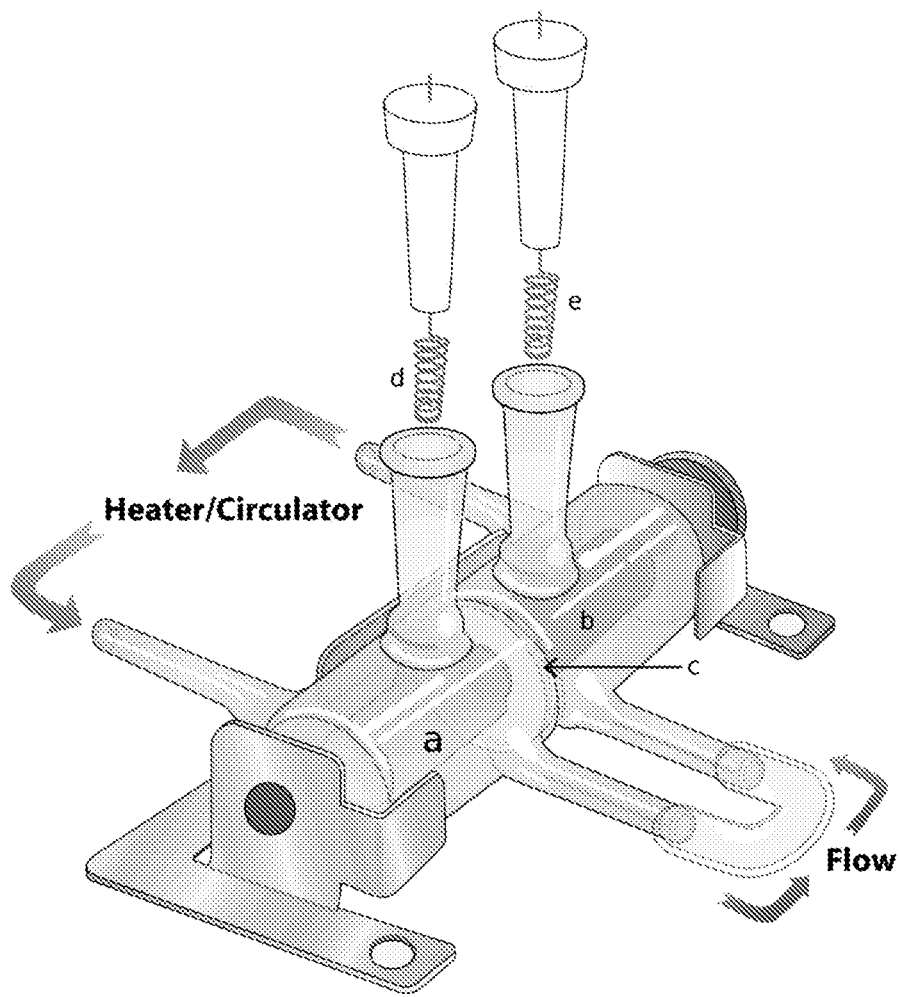
FIG. 8 depicts a further cell configuration according to the present disclosure.

Further testing was performed using a cell configuration according to FIG. 8.

In these tests the electrolytes were prepared as follows:

0% State-of-Charge Electrolyte

Sufficient anhydrous CuCl (anhydrous copper(I)chloride powder, 97%, Alfa Aesa) and fuming HCl (37%, Merck) to achieve concentrations of 2M and 8M respectively are weighed in to a volumetric flask and made up to the intended volume with distilled water. This electrolyte inevitably contains traces of Cu$^{2+}$, either through contamination of the original CuCl salt or the ingress of oxygen during preparation. It is possible to eliminate this contamination prior to loading the electrolyte in to the cell by adding a small amount of copper powder (99%, British Drug House) and shaking the flask for around a minute, at which point the electrolyte should be colourless. The electrolyte is carefully decanted from the volumetric flask during filling of the electrochemical cell to prevent any copper powder from being transferred.

50% State-of-Charge Electrolytes

In certain experiments it was desirable to initialize the system using electrolytes that simulate conditions at 50% state-of-charge (SOC). In the case of the negative half-cell electrolyte this was achieved by preparing a solution using the same method as described above, however, the CuCl concentration was reduced to 1M. In the case of the positive half-cell electrolyte the concentration of CuCl was similarly reduced to 1M and an additional 1M of CuCl$_2$ (Riedel de Haen,purum) was added, resulting in a solution that is equimolar in Cu$^{2+}$ and Cu$^+$. When preparing positive half-cell electrolyte at 50% SOC the reaction with copper powder was not performed to prevent reduction of Cu$^{2+}$ to Cu$^+$.

Evaluation of the Current Efficiency of the Negative Electrode Reaction

To independently study the efficiency of the deposition and stripping reaction a thermostatted and air-tight glass cell was filled with the Cu$^+$ electrolyte of 0% state-of-charge electrolyte. This cell was used to perform three electrode measurements, the working electrode was a rotating disc electrode (RDE) tip (5 mm active electrode area, Pine instruments, no rotation was used, platinum or glassy carbon active electrode material) and the quasi-reference and counter electrodes were both 2 mm diameter grade-A copper wires. The electrolyte was stirred vigorously to ensure a continuous supply of fresh electrolyte to the surface of the working electrode. A small amount of copper turnings (>99.0%, Fluka) were added to the bottom of this cell to ensure that any $Cu^{2+}$ formed, for instance due to oxygen permeation, was converted to $Cu^+$. A completely colorless electrolyte was typically achieved after fifteen minutes of commencing stirring.

The current efficiency of the deposition and stripping process was evaluated by galvanostatically depositing and then stripping copper from the working electrode using an Autolab PGSTAT12 potentiostat. The potential of the electrode was monitored during stripping and in the event that the potential rose above 0.45 V the stripping process was aborted. In the event of incomplete stripping of the copper deposit due to passivation the electrode was restored to the original pristine condition by repeatedly applying a constant potential of 0.3 V for a period of one minute until the open circuit potential (OCP) returned to a value higher than 0.3 V.

Evaluation of Current Efficiency Losses Due to Permeation of $Cu^{2+}$

To develop a RFB that is cost effective it would appear to be imperative to replace costly perfluorinated ion-exchange membranes with more cost-effective materials, such as microporous separators, which have at least an order of magnitude lower unit-cost. These materials are non-selective and therefore $Cu^{2+}$ ions present in the positive half-cell electrolyte will inevitably diffuse through the separator and react with the copper present in the negative half-cell leading to self-discharge of the battery. A commercial lead acid battery separator was used which has previously been used in RFB studies, namely Daramic (0.5 mm plain microporous polyethylene).

Permeability cells were employed to study permeation. These are typically used to study similar parasitic processes in fuel cell membranes, for instance methanol permeation through Nafion in direct methanol fuel cells.

The two electrodes, which are not typically used in fuel-cell permeability experiments, transform the permeability cells in to an extremely simple and reliable miniature RFB with an electrolyte volume of only 5 ml. This system also has precise temperature control over a range up to 95° C. and minimal corrosion problems. In these experiments the area of each graphite electrode (Faber-Castell TK 9071, 2 mm, graphite composite) is close to that of the separator, being 0.6 cm$^2$ and 0.5 cm$^2$ respectively. This is similar to the conditions in the larger cell shown in FIG. 9.

The rate at which $Cu^{2+}$ permeates through the separators is assessed by filling the negative and positive half-cells with the $Cu^+$ and mixed $Cu^+$—$Cu^{2+}$ electrolytes, which simulates a system with both electrolytes at 50% SOC. This cell is then cycled over a range of current densities from 5 to 200 mA cm$^{-2}$ with an initial charging step of 200 s followed by discharge. Ten measurements were performed at each current density to allow the system to reach equilibrium conditions before proceeding to the next current density. The electrolytes were not replaced during these measurements.

Construction and Operation of a Single-Cell RFB

A single-cell RFB with an electrode surface area of 18 cm$^2$ was prepared from cost effective and widely available materials using the simple methods described below.

The microporous separator material was compressed between two expanded graphite foil electrodes (SGL Group, 0.6 mm SIGRACELL TF6), with frame shaped gaskets (Silicone rubber, 2 mm, Hexamer OY, Finland) inserted between the separator and foils to create the cell chambers. Electrolyte was introduced and withdrawn from the ends of these chambers by two lines of small openings punched in to the electrodes at the top and bottom of each cell chamber. These holes allow liquid to pass to and from the manifolds behind the electrode, which are formed by cutting two large rectangular apertures in a rubber sheet (Silicone rubber, 4 mm, Hexamer OY, Finland). These apertures span the top or bottom line of openings respectively and are positioned directly underneath the inlet and outlet connectors of each half-cell.

Figure 9:
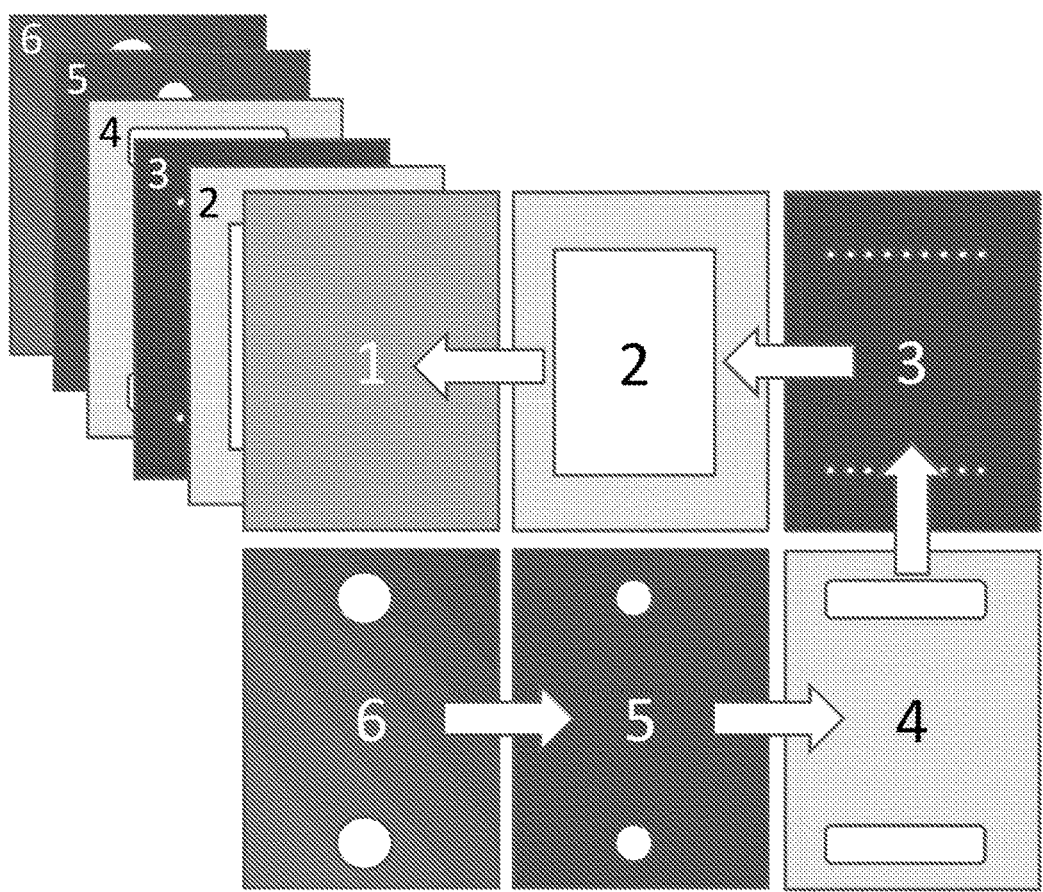
FIG. 9 depicts a detailed schematic construction of a cell according to the present invention.

This construction method is shown in FIG. 9. The reservoirs were two airtight and thermostatted glass vessels each filled with 80 ml of the electrolyte. The electrolytes were circulated by means of two speed programmable centrifugal pumps (Iwaki, RD-12TE24-N1V12) operating at their lowest flow rate (0.22 l/min, which is 2% of maximum flow rate).

Example 5

The efficiency of the deposition and stripping reaction was studied.

The dependency between current efficiency and current density for the deposition and stripping of copper on a Pt RDE tip in a three electrode cell is shown in FIG. 10A. At current densities between 20 to 125 mA cm$^{-2}$ the round trip current efficiency for the deposition and stripping reaction, $\eta_{i,cathode}$, is relatively constant with a value of 98±3%. At current densities beyond 125 mA cm$^{-2}$ the electrode passivates during stripping and the current efficiency drops sharply. This correlates strongly with the OCP values observed after the cycling process, with the electrode showing a negligible potential difference versus the copper wire quasi reference electrode at current densities above 125 mA cm$^{-2}$. This indicates incomplete stripping of the copper deposit. When the stripping process is reactivated at a lower current density it completes successfully and the surface of the electrode is restored to the original pristine state.

Based on these observations it would appear a current density of 125 mA cm$^{-2}$ is the maximum value supported by the negative electrode surface reaction. This is confirmed when the duration of the deposition and stripping processes is varied at a current density of 125 mA cm$_{-2}$, with the system showing a steady current efficiency of 98±1% over a range of deposition times up to thirty minutes. These measurements demonstrate that the problem of hydrogen evolution is largely avoided in the all-copper system and that the desired negative electrode reactions take place with good efficiency over a broad range of current densities from 20 to 125 mA cm$^{-2}$. This compares particularly favourably with the results previously reported for RFBs based on zinc deposition, where the current efficiency drops from 95% to 80% at current densities below 50 mA cm$^{-2}$.

The results at the glassy carbon electrode, shown in FIG. 10B, demonstrate much poorer efficiency at low current densities, in stark contrast to the platinum electrode. This is due to the low rate of copper nucleation on this material which, because of the short duration of the deposition step, results in incomplete coverage of the inert electrode and the growth of localized copper islands. At low current densities there are far fewer nucleation sites generated and since these have a smaller surface than the geometric electrode surface they become more easily passivated during the stripping process. As is shown above when longer deposition times are used carbon materials can deliver equally good current efficiency as platinum.

Example 6

Figure 11:
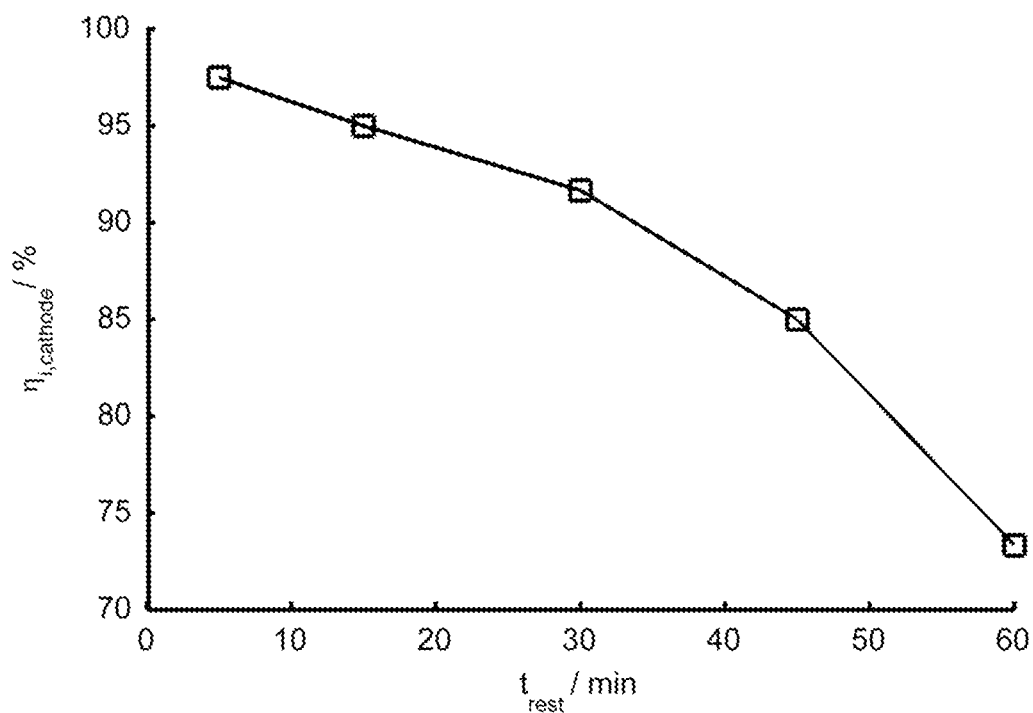
FIG. 11A shows the correlation between current efficiency and rest time between charging and discharging.
FIG. 11B shows the correlation between current efficiency and current density for a complete all-copper RFB at 60° C.
Figure 11:
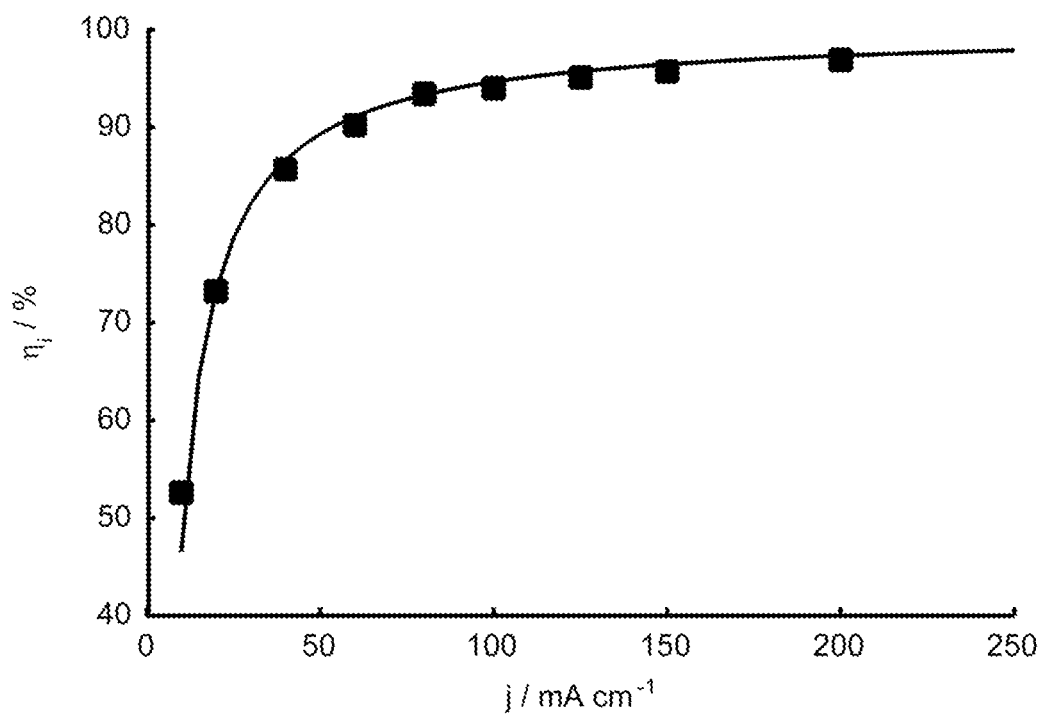

The three electrode cell was also used to perform measurements where a charging current density of 100 mA cm$^{-2}$ was applied for 60 seconds and the platinum electrode was then held at zero current density, i.e. OCP, for varying periods of time prior to stripping of the copper deposit. This method simulates the effect of the negative electrode of the battery being charged and then left in an idle state before discharge. The correlation between current efficiency and rest time is shown in FIG. 11A. The drop in efficiency indicates there is a slow corrosion process occurring at the copper electrode, equivalent to a parasitic current of around 0.1 mA cm$^{-2}$. This relatively negligible effect may also be attributable to permeation of oxygen in to the cell, although hydrogen evolution cannot be entirely ruled out at this point. This result shows that the copper deposit formed is extremely stable in the electrolyte used, when compared to values reported previously for zinc or iron based RFBs.

Example 7

The effect of Cu$^{2+}$ permeation through the separator was studied on the current efficiency of the cell.

The extent to which Cu$^{2+}$ permeation through the separator impacts the current efficiency of the cell, $\eta_i$, was tested using the miniature RFB. FIG. 11B shows that the dominant cause of poor current efficiency at current densities below 50 mA cm$^{-2}$ is the permeation of Cu$^{2+}$ through the separator, since $\eta_i$ monotonously increases towards an asymptote of 98% at higher current densities. At current densities of 40, 100 and 250 mA cm$^{-2}$ $\eta_i$ of the miniature RFB was 85.7, 94.0 and 96.9%, respectively.

Example 8

Figure 12:
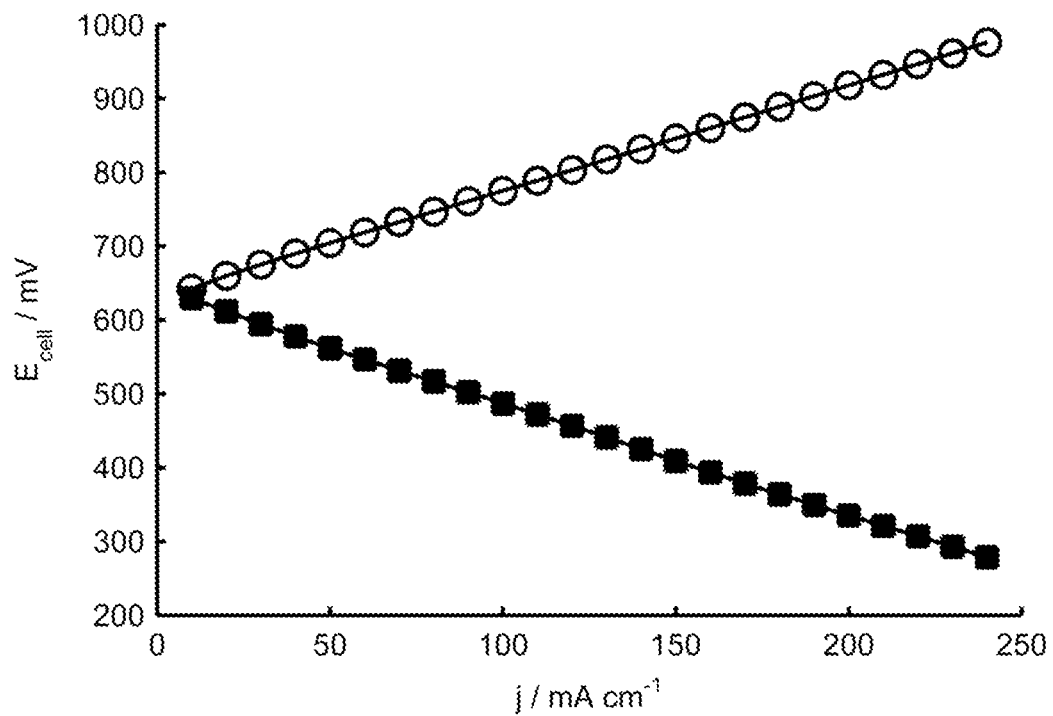
FIG. 12A shows the polarization curve for the RFB design shown in FIG. 9.
FIG. 12B shows the current efficiency (crosses), voltage efficiency (diamonds) and energy efficiency (squares) for the RFB design shown in FIG. 9.
Figure 12:
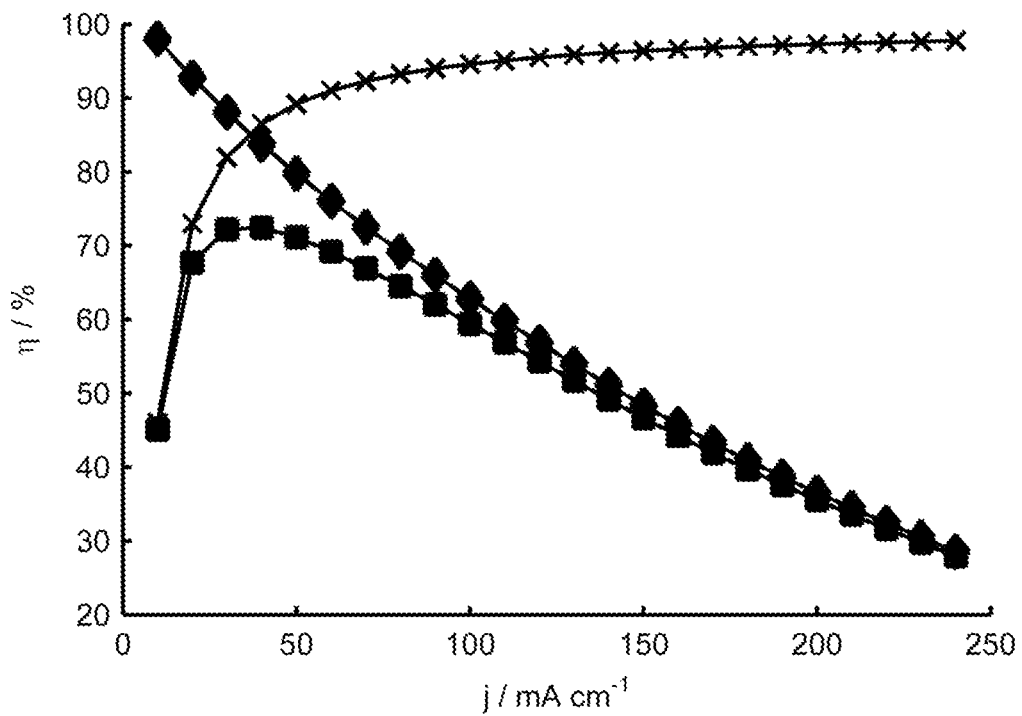

The voltage efficiency, $\eta_V$, of a realistic all-copper RFB was studied using the optimized cell design of FIG. 9. A typical polarization curve is shown in FIG. 12A.

The relation between potential and current density during both charging and discharging is highly linear and yields an area specific resistance (ASR) of 1.4 to 1.5 cm$^2$. Based on the overpotentials observed, $\eta_V$ can be estimated for the optimized RFB, this is shown in FIG. 12B. These results can be combined with the current efficiency measurements to determine round trip energy efficiency, $\eta_E$, this is also shown in FIG. 12B.

Based on the high conductivity of the electrolyte at 60° C., which is 957 mS cm$^{-1}$, the ASR due to Ohmic losses is estimated to be 0.35 Ωcm$^2$, therefore a significant fraction of the overpotentials observed must be attributable to concentration or activation overpotentials at the electrodes or additional Ohmic losses in the separator. Nonetheless, an ASR of 1.5 Ωcm2 compares favourably with the value of 4.5 to 5.4 Ωcm2 obtained during initial development work on the all-vanadium RFB (VRFB).

A peak in $\eta_E$ of 72% occurs at a current density of around 30 to 40 mA cm$^{-2}$, the drop in $\eta_E$ at higher current densities is relatively small and doubling of the current density to 70 mA cm$^{-2}$ results in a relatively modest decrease of $\eta_E$ to only 67%. By comparison, in the widely reported zinc-bromine RFBs typical operational current density and $\eta_E$ are 20 mA cm$^{-2}$ and 75% respectively. A value of 75% for the $\eta_E$ is also not uncommon for the VRFB. Therefore the peak $\eta_E$ value of 72% observed for the all-copper RFB appears to be reasonable at this early stage of technical development.

When the all-copper battery is operated at 70 mA cm$^{-2}$ a power density of 37 mW/cm$^2$ is achieved during discharge. This is the same power density achieved in the zinc-bromine RFB when operated at typical conditions of 20 mA cm$^{-2}$. This suggests that the low cell potential in the all-copper RFB is balanced by relatively low Ohmic losses, high deposition efficiency and facile reaction kinetics.

Example 9

Cycling experiments with a single-cell RFB were performed to demonstrate that the all-copper battery can be effectively cycled over longer periods. The miniature RFB was loaded with the electrolyte i.e. 2M in CuCl and at 0% SOC. The system was then left to cycle at a current density of 150 mA cm$^{-2}$, with monitoring of the cell potential to prevent overcharging. The potential cut-off limits used for charging and discharging were 0.9 and 0.3 V respectively. A full charge-discharge cycle over the entire theoretical SOC range of the cell would require four hours under these conditions.

Figure 13:
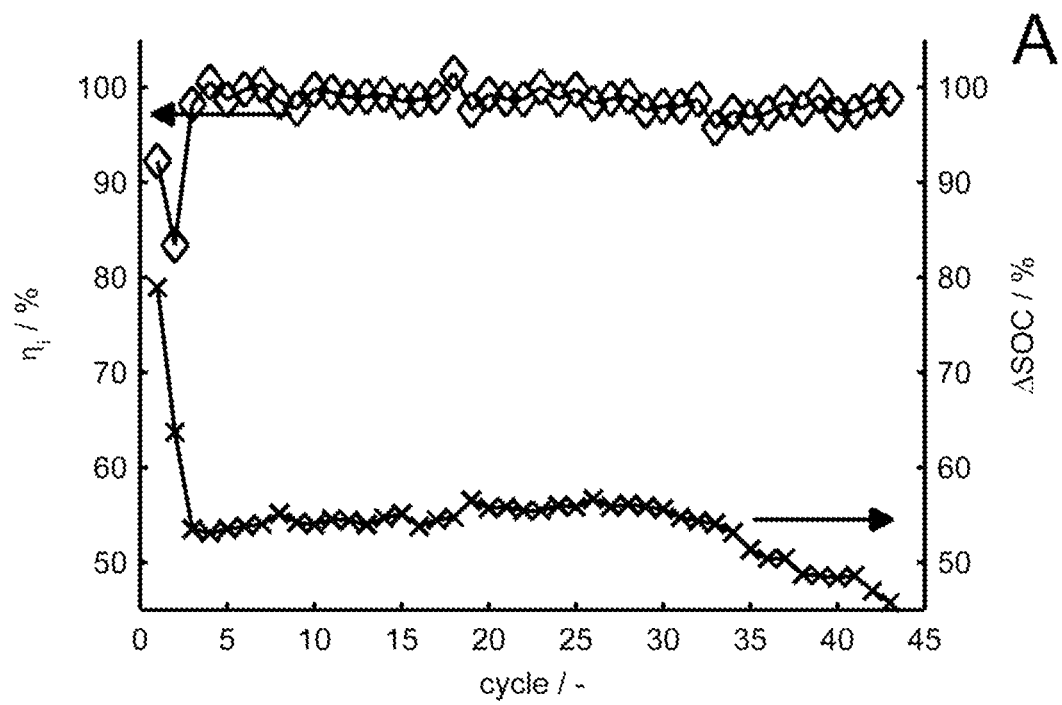
FIG. 13A shows the current efficiency (diamonds) and SOC range accessible (crosses) during 43 cycles of the RFB shown in FIG. 8.
FIG. 13B shows the OCP values after charging (circles) and discharging (squares) during 43 cycles of the RFB shown in FIG. 8.
Figure 13:
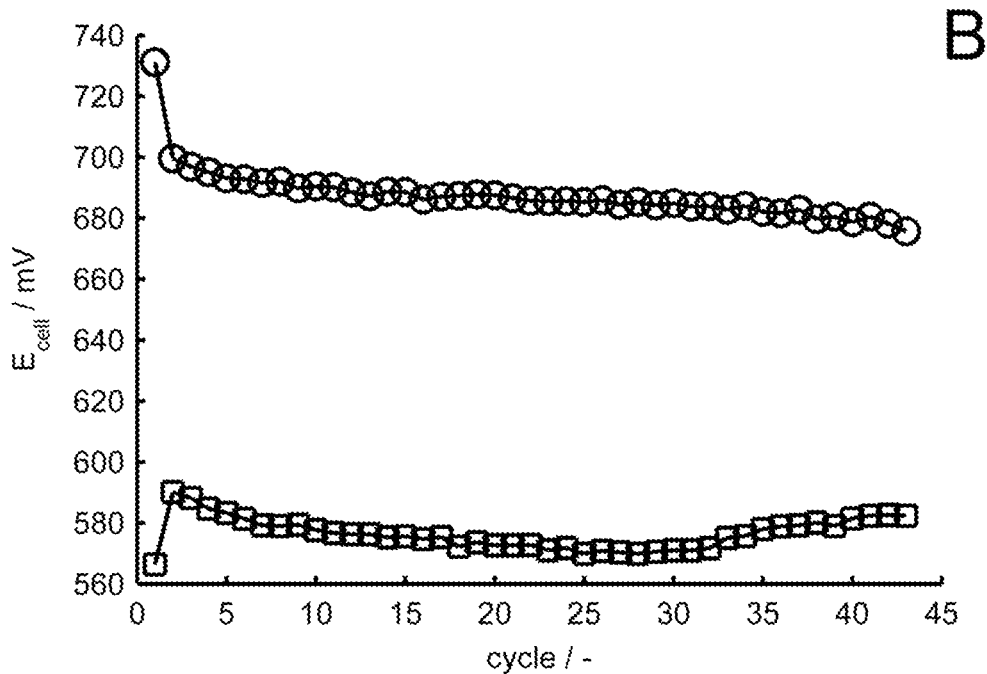

FIG. 13 A shows that the depth of charging was higher during the first two cycles and correlated with a poor $\eta_i$, this indicates that the system is not able to fully discharge to 0% SOC at the high current density applied. Presumably, this is due to the concentration of Cu$^{2+}$ becoming too low to sustain the discharge process at low SOC. After the second cycle the SOC range accessible during cycling showed a gentle rise to a maximum of 57% by the 26$_{th}$ cycle. During the last 13 cycles it dropped relatively rapidly to 46% by the last cycle. After the first two initial cycles $\eta_i$ was a steady 98.6±2.1% until cycling was manually terminated after the 43$_{rd}$ cycle.

FIG. 13B shows that the open circuit potential, OCP, after charging dropped monotonously from 0.73 to 0.68V. The OCP after discharge initially rose from 0.57 to 0.59V during the first two cycles, which correlates well with the poor value of $\eta_i$ observed, before slowly dropping back to 0.57V by the 30$_{th}$ cycle, at which point it rose again to 0.58V during the remaining cycles applied. Average OCP observed using this battery was 0.63V, which is close to the theoretical cell potential of 0.65V. By contrast, for the experiments where the system was initialised at 50% SOC the OCP was typically 0.68V after cycling completed.

The invention claimed is:

1. An aqueous all-copper redox flow battery, comprising:
   (i) at least one first half-cell compartment including a first aqueous electrolyte solution comprising a copper compound and a first supporting electrolyte and a first electrode,
   (ii) at least one second half-cell compartment including a second aqueous electrolyte solution comprising a copper compound and a second supporting electrolyte and a second electrode,
   (iii) first external storage tank for the first electrolyte residing outside of the at least one first half-cell compartment,
   (iv) second external storage tank for the second electrolyte residing outside of the at least one second half-cell compartment,
   (v) means for circulating the electrolytes to and from the half-cell compartments; and
   (vi) a separator between the first and the second half-cell compartments,
   wherein the first supporting electrolyte and the second supporting electrolyte comprise aqueous halide solutions, and
   wherein the half-cell compartments are configured to conduct oxidation and reduction reactions for charging and discharging the battery and wherein the at least one first half cell comprises a Cu+/Cu0 redox couple and the reaction at the first electrode is reduction of Cu+ to form Cu0 during charging and oxidation of Cu0 to form Cu+ during discharge, and the at least one second half cell comprises a Cu2+/Cu+ redox couple and the reaction at the second electrode is oxidation of Cu+ to form Cu2+ during charging and reduction of Cu2+ to form Cu+ during discharge, and Cu+ concentration of the first and the second electrolyte at the initial 0% state-of charge is from 1 to 4 M, and the first supporting electrolyte or the second supporting electrolyte or both of the supporting electrolytes comprise halide salts selected from the group consisting of sodium chloride, potassium chloride, lithium chloride, ammonium chloride, magnesium chloride, hydrogen chloride and calcium chloride.

2. The battery of claim 1, wherein the first electrolyte and the second electrolyte are at initial 0% state-of-charge identical solutions.

3. The battery of claim 1, wherein the first electrolyte and the second electrolyte comprise at the initial 0% state-of-charge a solution containing less than 0.01 M traces of Cu2+.

4. The battery of claim 1, wherein the first electrolyte and the second electrolyte are treated with metallic Cu before use.

5. The battery of claim 1, wherein the copper compound of the first electrolyte or the second electrolyte or both of the electrolytes comprise copper salt.

6. The battery of claim 1, wherein the first electrode and the second electrode are made of inert materials.

7. The battery of claim 1, wherein the first electrode and the second electrode are bipolar inert material, selected from the group consisting of platinum, titanium, stainless steel, carbon-polymer composite, carbon and any combination thereof.

8. The battery of claim 1, wherein material of said separator is a microporous material, nanoporous material, ion exchange membrane or ion conducting ceramic.

9. The battery of claim 1, wherein temperature of said first and second electrolyte is at least 50° C. during operation of the battery.

10. The battery of claim 1, which comprises a plurality of stacked cells the number of which is from 2 to 1000.

11. The battery of claim 4, wherein the metallic Cu is in the form of fine powder.

12. The battery of claim 5, wherein the copper salt is a copper halide salt.

13. The battery of claim 12, wherein the copper halide salt is a copper chloride salt.

14. The battery of claim 8, wherein the microporous material is silica-PVC or silica-polyolefin composites.

15. The battery of claim 8, wherein the ion exchange material is Nafion.

16. The battery of claim 8, wherein the ion-conducting ceramic is a lithium ion conducting ceramic.

* * * * *

UNITED STATES PATENT AND TRADEMARK OFFICE
CERTIFICATE OF CORRECTION

PATENT NO. : 10,128,519 B2
APPLICATION NO. : 15/125671
DATED : November 13, 2018
INVENTOR(S) : David Lloyd and Laura Sanz It is certified that error appears in the above-identified patent and that said Letters Patent is hereby corrected as shown below:

On the Title Page

The Assignee, "Aalto University Foundation", should be corrected to "Aalto University Foundation SR".

Signed and Sealed this
Second Day of July, 2019

Andrei Iancu
*Director of the United States Patent and Trademark Office*